US011273682B2

(12) United States Patent
Kubota

(10) Patent No.: US 11,273,682 B2
(45) Date of Patent: Mar. 15, 2022

(54) SUSPENSION SYSTEM AND VEHICLE

(71) Applicant: Yamaha Hatsudoki Kabushiki Kaisha, Shizuoka (JP)

(72) Inventor: Takahiko Kubota, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 45 days.

(21) Appl. No.: 16/835,335

(22) Filed: Mar. 31, 2020

(65) Prior Publication Data

US 2020/0307342 A1 Oct. 1, 2020

(30) Foreign Application Priority Data

Apr. 1, 2019 (JP) .............................. JP2019-070175

(51) Int. Cl.
*B60N 2/02* (2006.01)
*B60G 17/015* (2006.01)
*B60G 17/04* (2006.01)
*B60G 13/08* (2006.01)
*B60G 21/073* (2006.01)

(52) U.S. Cl.
CPC ......... *B60G 17/0424* (2013.01); *B60G 13/08* (2013.01); *B60G 21/073* (2013.01); *B60G 2202/154* (2013.01); *B60G 2300/322* (2013.01)

(58) Field of Classification Search
CPC ........... B60G 2202/154; B60G 21/073; B60G 13/08; B60G 17/0424
See application file for complete search history.

(56) References Cited

U.S. PATENT DOCUMENTS 1,963,533 A * 6/1934 Svensson ............. B60G 21/073
267/186
2,843,396 A 7/1958 Lucien
(Continued)

FOREIGN PATENT DOCUMENTS

DE 3942654 A1 * 6/1991 ......... B60G 17/0162
DE 102011115402 A1 4/2012
(Continued)

OTHER PUBLICATIONS

Machine translation of DE 3942654 A1 obtained from espacenet.com Jul. 30 (Year: 2021).*
(Continued)

*Primary Examiner* — Paul N Dickson
*Assistant Examiner* — Maxwell L Meshaka
(74) *Attorney, Agent, or Firm* — HEA Law PLLC

(57) ABSTRACT

In a suspension system in which the oil chambers of two dampers are connected, the responsiveness of the dampers can be adjusted. A suspension system has a left damper, a right damper, and an intermediate unit. A case of the intermediate unit has an intermediate oil chamber connected to an oil chamber of the left damper and the oil chamber of the right damper and an intermediate gas chamber. The intermediate oil chamber and the intermediate gas chamber are partitioned by a diaphragm. The intermediate unit has a capacity adjustment mechanism including a movable portion of which the position can be changed. The capacity adjustment mechanism adjusts the capacity of the intermediate gas chamber by changing the position of the movable portion.

16 Claims, 17 Drawing Sheets

(56) References Cited

U.S. PATENT DOCUMENTS

| | | |
|---|---|---|
| 3,112,923 A | 12/1963 | Ley |
| 3,854,710 A | 12/1974 | Nicholls |
| 4,275,900 A | 6/1981 | Andreoli et al. |
| 4,478,431 A | 10/1984 | Muller et al. |
| 4,497,505 A | 2/1985 | Harrison et al. |
| 5,486,018 A | 1/1996 | Sakai |
| 5,794,966 A * | 8/1998 | MacLeod ............ B60G 21/067 280/124.104 |
| 5,996,978 A * | 12/1999 | Asanuma ........... B60G 17/0408 188/315 |
| 6,024,366 A | 2/2000 | Masamura |
| 6,250,658 B1 | 6/2001 | Sakai |
| 6,318,525 B1 | 11/2001 | Vignocchi et al. |
| 10,144,444 B2 | 12/2018 | Sawai et al. |
| 10,315,483 B2 | 6/2019 | Sawai |
| 10,683,907 B2 | 6/2020 | Hufenbach et al. |
| 2004/0020730 A1 | 2/2004 | Turner |
| 2005/0012255 A1 | 1/2005 | Denk |
| 2011/0068552 A1* | 3/2011 | Ryan .................... B60G 21/073 280/124.106 |
| 2013/0144489 A1 | 6/2013 | Galasso et al. |
| 2013/0264784 A1 | 10/2013 | Venton-Walters et al. |
| 2018/0072126 A1 | 3/2018 | Sawai |
| 2019/0077210 A1 | 3/2019 | Moroni et al. |
| 2020/0307342 A1 | 10/2020 | Kubota |

FOREIGN PATENT DOCUMENTS

| | | |
|---|---|---|
| EP | 0980774 A2 | 2/2000 |
| EP | 1419911 A2 | 5/2004 |
| EP | 3293023 A1 | 3/2018 |
| FR | 1228272 A | 8/1960 |
| GB | 931300 A | 7/1963 |
| GB | 1311646 A | 3/1973 |
| JP | S60203515 A | 10/1985 |
| JP | H08-132846 A | 5/1996 |
| JP | 2000135910 A | 5/2000 |
| JP | 2017-136918 A | 8/2017 |
| JP | 2018-039481 A | 3/2018 |
| WO | 2014075661 A1 | 5/2014 |
| WO | 2017157976 A1 | 9/2017 |

OTHER PUBLICATIONS

Search Report dated Aug. 28, 2020, for relating EP Patent Application No. 20167077.5.

Search Report dated Aug. 28, 2020, for corresponding EP Patent Application No. 20167079.1.

Office Action dated May 12, 2021, for corresponding U.S. Appl. No. 16/835,253 pp. 1-24.

Office Action dated Oct. 12, 2021, for relating U.S. Appl. No. 16/835,253 pp. 1-22.

* cited by examiner

SUSPENSION SYSTEM AND VEHICLE

CROSS-REFERENCE TO RELATED APPLICATION

The present application claims priority from Japanese application JP2019-070175 filed on Apr. 1, 2019, the content of which is hereby incorporated by reference, in its entirety, into this application.

FIELD OF THE INVENTION

The present disclosure relates to a suspension system included in a vehicle such as a four-wheeled vehicle or a snowmobile.

BACKGROUND OF THE INVENTION

Description of the Related Art

JP 2017-136918A and JP H8-132846A disclose a suspension system having an intermediate unit disposed between a right damper and a left damper. The intermediate unit has an oil chamber (referred to as "intermediate oil chamber"), and a gas chamber (referred to as "intermediate gas chamber") partitioned by a free piston. The free piston can move in an axial direction in a case (cylinder) forming the intermediate unit according to expansion and contraction of the intermediate oil chamber. The intermediate oil chamber is connected to oil chambers of left and right dampers and oil flow between the oil chamber of each damper and the intermediate oil chamber and oil flow between the oil chambers of the left and right dampers via the intermediate oil chamber are allowed. Such an intermediate unit improves a function of the damper at a time when a wheel rides on a bump and a function of the damper at a time when the vehicle turns.

SUMMARY OF THE INVENTION

When traveling on a continuous bumpy road, a damper repeatedly stretches and contracts. At the moment when the movement of the damper switches from contraction to extension, it is desirable that the force exerted by the damper also switches from resistance (damping force) to contraction to resistance (damping force) to extension. That is, it is desirable that the damper always exerts a force that resists the movement of the damper. However, if the responsiveness of the damper is slow, a gap is caused between the time at which the movement of the damper switches and the time at which a direction of the force generated by the damper switches.

(1) A suspension system proposed in the present disclosure includes a first damper having a cylinder in which an oil chamber is formed, a second damper having a cylinder in which an oil chamber is formed, and an intermediate unit which includes a case having an intermediate oil chamber connected to the oil chamber of the first damper and the oil chamber of the second damper and an intermediate gas chamber, and a partition member for partitioning the intermediate oil chamber and the intermediate gas chamber. The intermediate unit has a capacity adjustment mechanism including a movable portion which faces the intermediate gas chamber and of which a position or a size can be changed. The capacity adjustment mechanism allows a capacity of the intermediate gas chamber to be adjustable by changing the position or size of the movable portion. According to this suspension system, the responsiveness of the damper can be adjusted by adjusting the capacity of the intermediate gas chamber.

(2) In the suspension system according to (1), the case may have a cylindrical main body and the position or size of the movable portion may be changeable in a direction along an axis of the cylindrical main body. According to this, the structure of the intermediate unit can be simplified.

(3) In the suspension system according to (2), one end portion of the cylindrical main body is open and the movable portion forms a member for closing the one end portion of the cylindrical main body. According to this, it is possible to suppress an increase in the number of parts of the intermediate unit.

(4) In the suspension system according to (3), the movable portion may be located on an outer side of the one end portion of the cylindrical main body. According to this, the capacity of the intermediate gas chamber can be increased.

(5) In the suspension system according to (1) or (2), the movable portion may include a pressure receiving portion facing the intermediate gas chamber and an operated portion extending from the pressure receiving portion to an opposite side to the intermediate gas chamber and protruding outside the case. According to this, the operation of the movable portion may be facilitated.

(6) In the suspension system according to (2), the intermediate unit may include a first damping force generating mechanism located on a first oil flow path which is a flow path between the intermediate oil chamber and the oil chamber of the first damper and a second damping force generating mechanism located on a second oil flow path which is a flow path between the intermediate oil chamber and the oil chamber of the second damper. The movable portion may be located on a side opposite to the first damping force generating mechanism and the second damping force generating mechanism in the direction along the axis of the cylindrical main body. According to this, it is possible to avoid a complicated layout of components in the intermediate unit.

(7) In the suspension system according to any one of (1) to (6), a gas pressure adjusting hole, which is a hole that enables gas injection and gas discharge with respect to the intermediate gas chamber, may be formed in the movable portion.

(8) The suspension system according to any one of (1) to (7), further may comprise an actuator for moving the position of the movable portion. According to this, the capacity of the intermediate gas chamber can be easily adjusted.

(9) In the suspension system according to any one of (1) to (8), the position or size of the movable portion may be changed continuously. According to this, the capacity of the intermediate gas chamber can be finely adjusted.

(10) In the suspension system according to any one of (1) to (8), the position or size of the movable portion may be changed stepwise. According to this, the adjustment work by an operator on the capacity of the intermediate gas chamber can be simplified.

(11) In the suspension system according to any one of (1) to (10), the partition member may be a free piston.

(12) In the suspension system according to any one of (1) to (10), the partition member may be a diaphragm having flexibility.

(13) A vehicle proposed in the present disclosure includes the suspension system according to anyone of (1) to (12), a vehicle body frame, and wheels or skis connected to the vehicle body frame through the suspension system.

BRIEF DESCRIPTION OF THE DRAWINGS

The present invention is illustrated by way of example and not limited in the figures of the accompanying drawings in which like references indicate similar elements.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments. In this specification, a suspension system 10 illustrated in FIG. 1 and the like will be described as an example of a suspension system proposed in the present disclosure. The suspension system 10 is mounted on vehicles such as snowmobiles and four-wheeled vehicles. The four-wheeled vehicle includes, for example, a passenger car, an All Terrain Vehicle (ATV), a Recreational Off-highway Vehicle (ROV), a golf cart, and the like.

Figure 1:
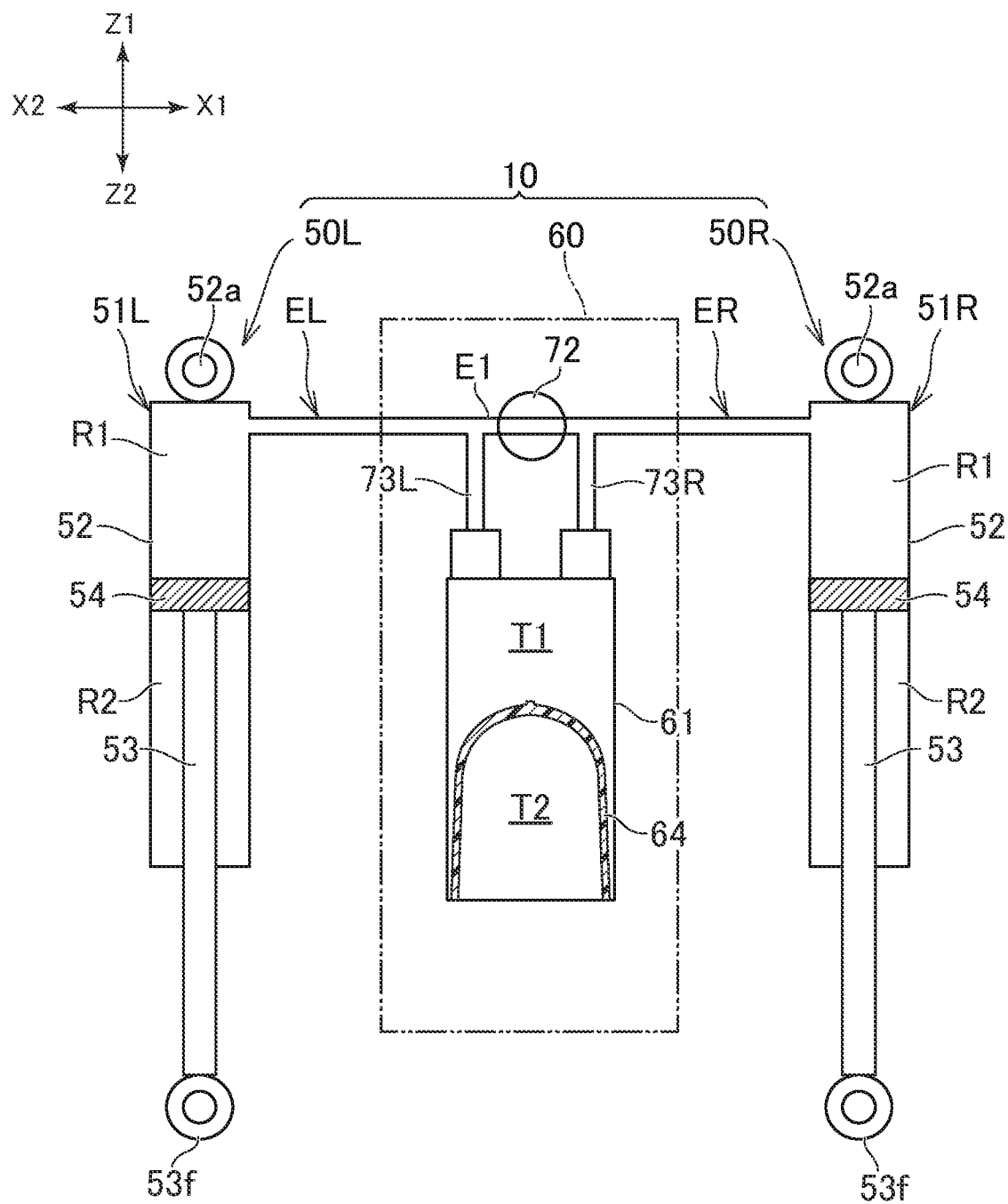
FIG. 1 is a schematic diagram illustrating an example of left and right dampers and an intermediate unit constituting a suspension system proposed in the present disclosure.
Figure 4A:
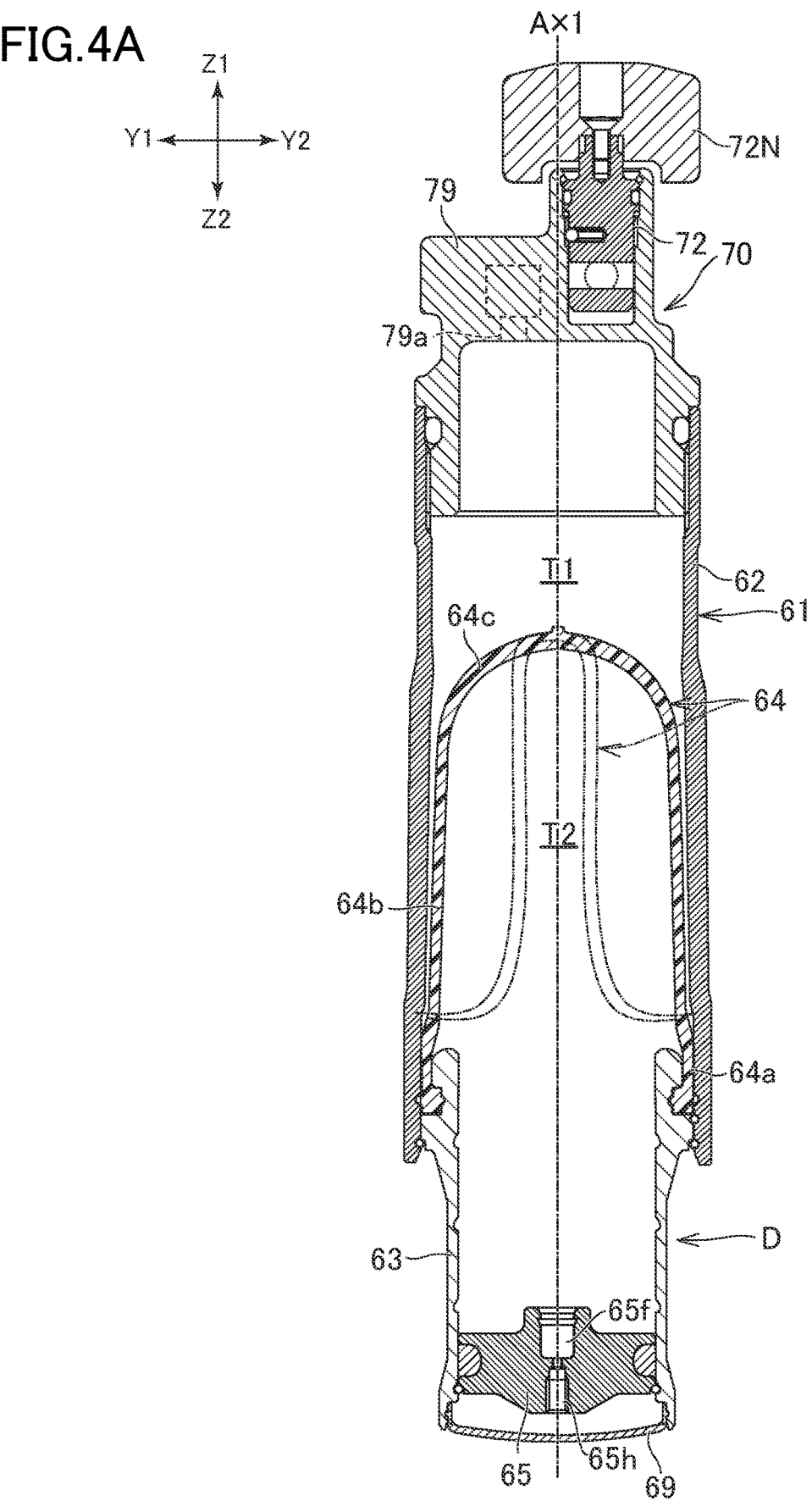
FIG. 4A is a cross-sectional view taken along the line IV-IV illustrated in FIG. 3A.

In the following description, directions indicated by X1 and X2 in FIG. 1 are referred to as right and left, respectively, and directions indicated by Z1 and Z2 in FIG. 1 are referred to as upper and lower, respectively. The directions indicated by Y1 and Y2 in FIG. 4A are referred to as front and rear, respectively.

(Damper)

As illustrated in FIG. 1, the suspension system 10 has two suspensions 50R and 50L. The suspensions 50R and 50L are respectively configured by dampers 51R and 51L and springs 59 (see FIG. 2). The suspension 50R is disposed, for example, in the right direction of a vehicle body and buffers up and down movement of a right ski or a right wheel (in this specification, a member which is in contact with a snow surface or a road surface and supports the vehicle body, such as a ski and a wheel, is referred to as a vehicle body support member). The suspension 50L is disposed, for example, in the left direction of the vehicle body and buffers up and down movement of the left vehicle body support member. In the following description, the damper 51R is referred to as the "right damper", and the damper 51L is referred to as the "left damper". When the suspension system 10 is mounted on a four-wheeled vehicle, one of the two suspensions may buffer the up and down movement of a front wheel and the other suspension may buffer the up and down movement of a rear wheel.

Figure 2:
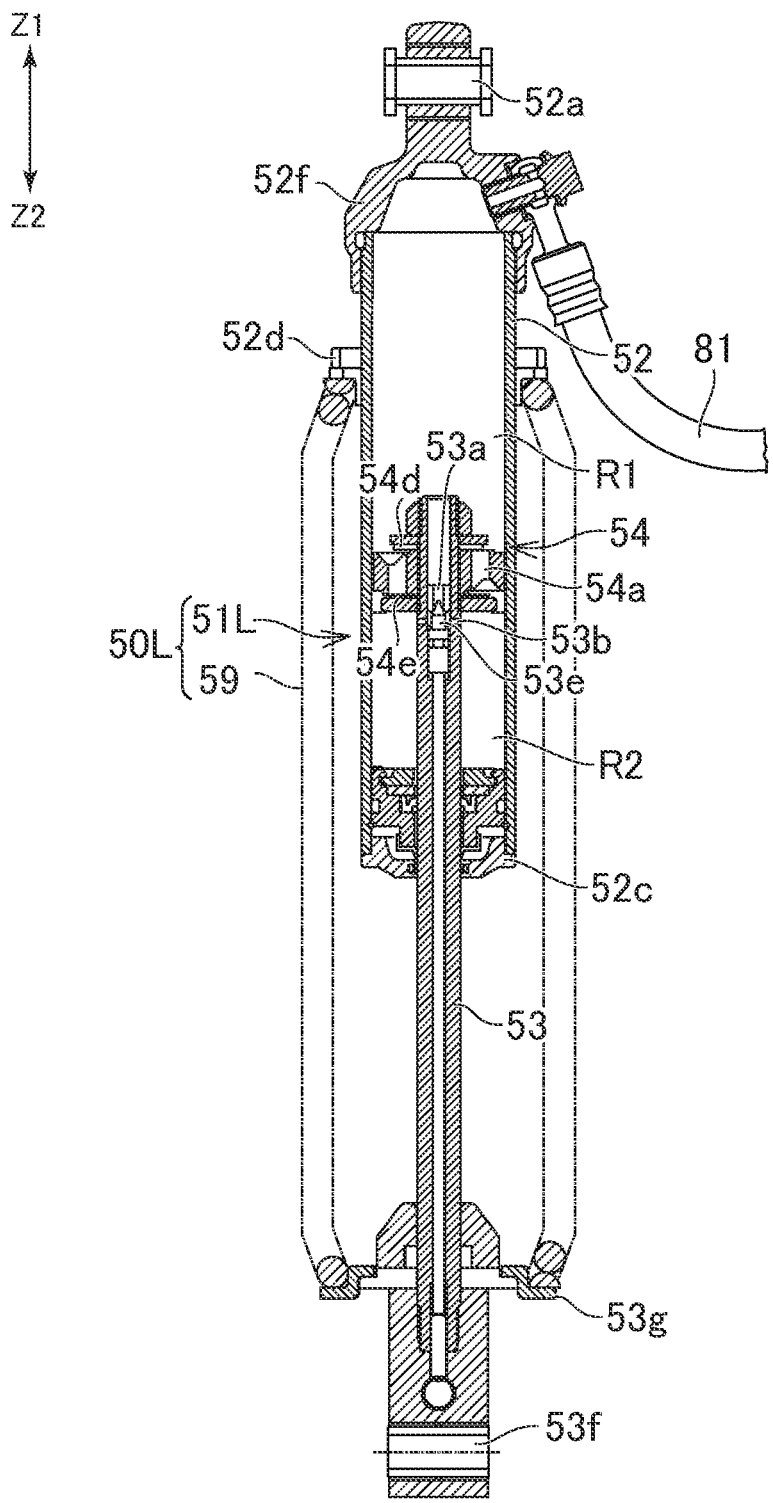
FIG. 2 is a cross-sectional view illustrating an example of a left suspension constituting the suspension system.

As illustrated in FIG. 2, the left damper 51L includes a cylinder 52 and a piston rod 53. The cylinder 52 includes oil chambers R1 and R2 in which oil is filled. The piston rod 53 has, at its end, a piston 54 which partitions the oil chambers R1 and R2. The piston 54 and/or the piston rod 53 include a damping force generating mechanism which generates a damping force when they move relative to the cylinder 52. The right damper 51R has the same structure as the left damper 51L. That is, the right damper 51R also includes the cylinder 52, the piston rod 53, the piston 54, and the damping force generating mechanism. Hereinafter, an example of the structure of the dampers 51R and 51L will be described with reference to the left damper 51L illustrated in FIG. 2.

As illustrated in FIG. 2, as an example of the damping force generating mechanism, the piston 54 has flow paths 54a and 54b which allow oil to move between the first oil chamber R1 and the second oil chamber R2 and valve plates 54d and 54e which open or close the flow paths 54a and 54b. When the oil passes through the flow paths 54a and 54b, a damping force is generated.

As illustrated in FIG. 2, as an example of the damping force generating mechanism, the piston rod 53 may include flow paths 53a and 53b which allow movement of oil between the first oil chamber R1 and the second oil chamber R2 and a needle valve 53e which adjusts the degree of opening of the flow paths 53a and 53b. A damping force is also generated when the oil passes through the flow paths 53a and 53b. The needle valve 53e is movable along an axial direction of the cylinder 52. The needle valve 53e can move to a closed position in which the needle valve 53e is fitted to the flow path 53a to close the flow path 53a, an open position in which the needle valve 53e is away from the flow path 53a to open the flow path 53a, and a position between the closed position and the open position. The damper 51L has an operation unit (not illustrated) connected to the needle valve 53e. A user can adjust the position of the needle valve 53e (in other words, the degree of opening of the flow paths 53a and 53b) by operating the operation unit.

As illustrated in FIG. 2, the cylinder 52 has a cap 52c at its lower end for closing the cylinder 52. The piston rod 53 extends from the piston 54 through the second oil chamber R2 toward the cap 52c and protrudes from the cap 52c to the outside of the cylinder 52.

Vehicles such as snowmobiles and four-wheeled vehicles have arms which connect the vehicle body support member and the vehicle body frame so that the vehicle body support member (skis or wheels) can move up and down relative to the vehicle body frame. For example, an end portion (lower end) 53f of the piston rod 53 is connected to this arm and an end portion (upper end) 52a of the cylinder 52 is connected to the vehicle body frame. Therefore, the piston 54 and the piston rod 53 move relative to cylinder 52 in accordance with the up and down movement of the vehicle body support member.

As illustrated in FIG. 2, a spring sheet 52d is attached to an outer peripheral surface of the cylinder 52 and a spring sheet 53g is attached to an end portion of the piston rod 53. The spring 59 is held between the spring sheet 52d and the spring sheet 53g.

(Intermediate Unit and Oil Flow Path)

As illustrated in FIG. 1, the suspension system 10 includes an intermediate unit 60 arranged in oil flow paths ER and EL connecting the first oil chamber R1 of the right damper 51R and the first oil chamber R1 of the left damper 51L. The left oil flow path EL has a pipe 81 (see FIG. 2) extending from the left damper 51L. The right oil flow path ER has the pipe 81 extending from the right damper 51R. The two pipes 81 are connected to the intermediate unit 60.

The intermediate unit 60 includes an intermediate oil chamber T1 connected to the first oil chambers R1 of the dampers 51R and 51L and an intermediate case 61 having therein an intermediate gas chamber T2. The intermediate gas chamber T2 is filled with, for example, a gas such as nitrogen or air. The intermediate unit 60 includes a diaphragm 64 (see FIG. 4A) described below as a partition member for partitioning the intermediate oil chamber T1 and the intermediate gas chamber T2. Unlike the example of the intermediate unit 60, the intermediate oil chamber T1 and the intermediate gas chamber T2 may be partitioned by a free piston 164 (see FIGS. 11A to 11C) described below. The intermediate oil chamber T1 and the intermediate gas chamber T2 are partitioned by the diaphragm 64 (see FIG. 4A) described below. The intermediate oil chamber T1 is connected to the first oil chamber R1 of the right damper 51R via the oil flow path ER and is connected to the first oil chamber R1 of the left damper 51L via the oil flow path EL. (Hereinafter, the oil flow path ER is referred to as the "right oil flow path" and the oil flow path EL is referred to as the "left oil flow path"). The right oil flow path ER and the left oil flow path EL are shown by of the pipes 81, and are (see FIGS. 2 and 3A) formed of rubber or resin, for example. A flow path to which the pipe 81 is connected is formed in a cap 52f (see FIG. 2) which closes the upper end of the cylinder 52.

For example, when the right vehicle body support member and the left vehicle body support member ride over a bump on a snow surface or a road surface, the two dampers 51R and 51L are simultaneously compressed, and thus the two dampers 51R and 51L move in the same direction. In this case, the oil moves from the first oil chambers R1 of the two dampers 51R and 51L to the intermediate oil chamber T1 through the oil flow paths ER and EL. As a result, the intermediate oil chamber T1 expands. For example, when the left damper 51L is compressed due to the vehicle turning right, the two dampers 51R and 51L move in opposite directions. In this case, oil moves from the left damper 51L to the intermediate oil chamber T1 and oil moves from the intermediate oil chamber T1 to the right damper 51R. As a result, the right damper 51R is extended and thus the contact pressure between the right vehicle body support member and the snow or road surface is secured.

(Partition Member)

As illustrated in FIG. 4A, the intermediate oil chamber T1 and the intermediate gas chamber T2 are arranged in a direction along an axis (the axis of a cylindrical main body 62 described below) Ax1 of the intermediate case 61. In the example of the intermediate unit 60, the intermediate gas chamber T2 is formed below the intermediate oil chamber T1. Conversely, the intermediate oil chamber T1 may be formed below the intermediate gas chamber T2. The intermediate gas chamber T2 is partitioned from the intermediate oil chamber T1 by the diaphragm 64.

The position of an outer peripheral edge 64a of the diaphragm 64 is fixed to the intermediate case 61. The diaphragm 64 is formed of a flexible material. The term "flexible" means that the material can be curved or bent. The diaphragm 64 may be stretchable or elastic due to the flexibility. The material of the diaphragm 64 is, for example, rubber. The diaphragm 64 may be formed of a resin which can be recessed, that is, has flexibility. When the oil flows into the intermediate oil chamber T1 from the dampers 51R and 51L, the diaphragm 64 is deformed, specifically, the diaphragm 64 is recessed (see the diaphragm 64 illustrated by a two-dot chain line in FIG. 4A), and thus the intermediate oil chamber T1 expands and the intermediate gas chamber T2 contracts. Conversely, when oil flows out from the intermediate oil chamber T1 to the oil chambers R1 of the dampers 51R and 51L, the diaphragm 64 is deformed, specifically, the diaphragm 64 is bulged to its original shape, and thus the intermediate oil chamber T1 contracts and the intermediate gas chamber T2 expands.

As illustrated in FIG. 4A, the diaphragm 64 bulges from an outer peripheral edge (lower edge) 64a toward the intermediate oil chamber T1. The diaphragm 64 is bulged in a direction (upward in the example described here) along the axis Ax1 of the intermediate case 61 and has a bag shape having the intermediate gas chamber T2 inside. The diaphragm 64 includes a body portion 64b of a cylindrical shape and a top portion 64c of a hemispherical shape located at an end portion of the body portion 64b. According to this shape of the diaphragm 64, when the oil flows into the intermediate oil chamber T1, for example, the body portion 64b is recessed (see the diagram 64 illustrated by a two-dot chain line in FIG. 4A). Therefore, the expansion of the intermediate oil chamber T1 and the contraction of the intermediate gas chamber T2 can be smoothly generated.

(Capacity Adjustment Mechanism)

As illustrated in FIG. 4A, the intermediate case 61 includes the cylindrical main body 62 having an open lower end portion, a guide cylinder portion 63, and a movable portion 65. The guide cylinder portion 63 and the movable portion 65 function as a lid member for closing the lower end portion of the cylindrical main body 62. The cylindrical main body 62 may have a cylindrical shape having a circular or elliptical cross section or a cylindrical shape having a square cross section. The inner surface of the guide cylinder portion 63 and the inner surface of the movable portion 65 face the intermediate gas chamber T2 and the intermediate gas chamber T2 is sealed by the guide cylinder portion 63, the movable portion 65, and the diaphragm 64.

The intermediate unit 60 has a capacity adjustment mechanism D for adjusting (increase/decrease) the capacity of the intermediate gas chamber T2. The capacity adjustment mechanism D allows the capacity of the intermediate gas chamber T2 to be changed. The capacity means a capacity in a static state where the dampers 51R and 51L are not expanded or contracted. That is, the capacity adjusting mechanism D can change the capacity of the intermediate gas chamber T2 without changing the shape or position of the partition member (diaphragm 64) between the intermediate gas chamber T2 and the intermediate oil chamber T1.

As illustrated in FIG. 4A, in the example of the intermediate unit 60, the capacity adjustment mechanism D has the movable portion 65 of which the position in the intermediate case 61 can be changed. The movable portion 65 faces the intermediate gas chamber T2. That is, the movable portion 65 forms a part of the inner surface of the intermediate gas chamber T2. Therefore, by changing the position of the movable portion 65, the capacity of the intermediate gas chamber T2 can be changed.

The position of the movable portion 65 can be moved in the direction along the axis Ax1 of the cylindrical main body 62. (In FIG. 4B, the movable portion 65 after the movement is indicated by a two-dot chain line.) The movable portion 65 is disposed so as to face a partition member (for example, the diaphragm 64) between the intermediate gas chamber T2 and the intermediate oil chamber T1 in the direction along the axis Ax1. The capacity adjustment mechanism D can increase or decrease the distance from the partition member to the movable portion 65 by changing the position of the movable portion 65.

Figure 4B:
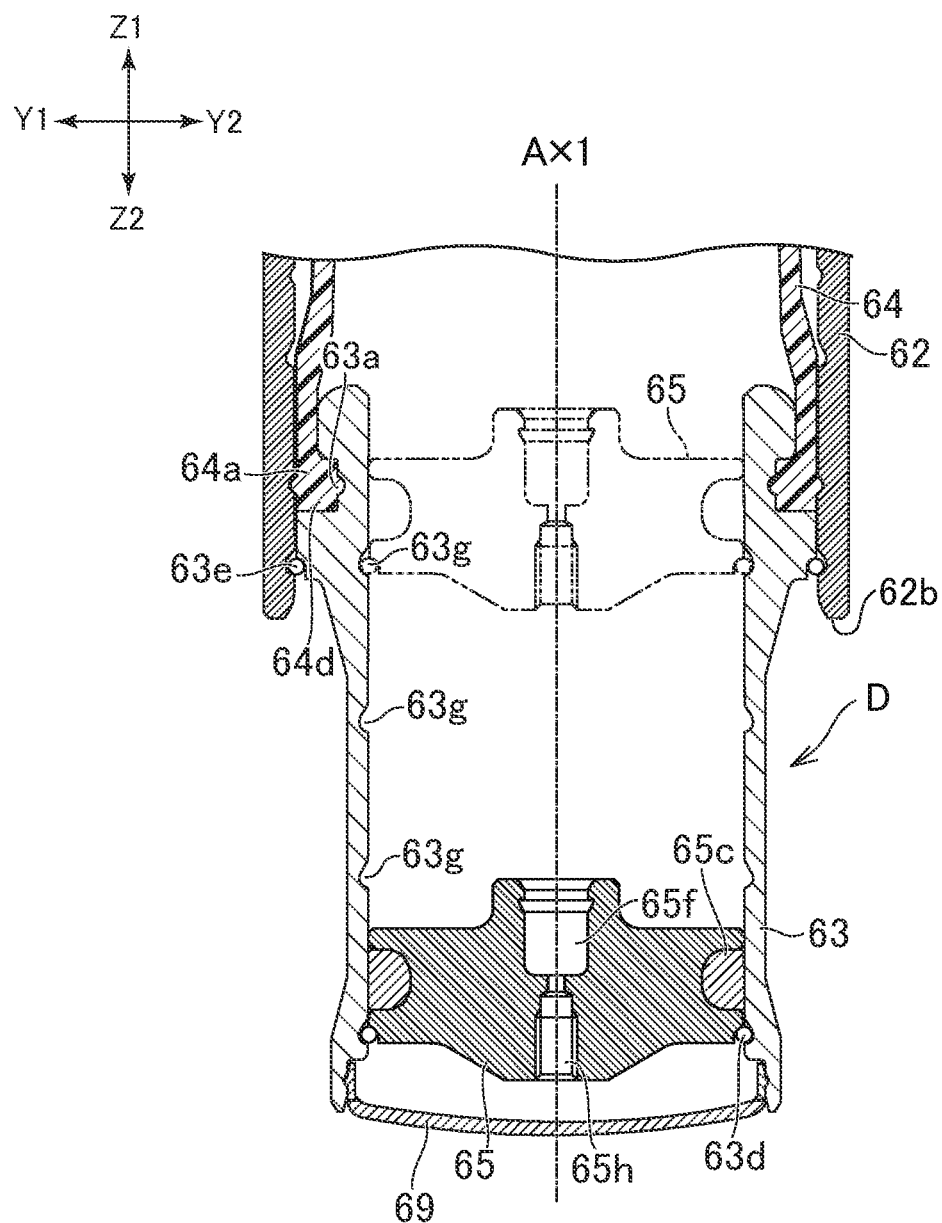
FIG. 4B is an enlarged view of a part of FIG. 4A.

As illustrated in FIG. 4B, the guide cylinder portion 63 is disposed along the axis Ax1 of the cylindrical main body 62. That is, the guide cylinder portion 63 and the cylindrical main body 62 have the common axis Ax1. The guide cylinder portion 63 is fitted inside the cylindrical main body 62. The outer peripheral edge 64a of the diaphragm 64, which is a partition member, is interposed between the outer peripheral surface of the guide cylinder portion 63 and the inner surface of the cylindrical main body 62, so that the diaphragm 64 is attached to the intermediate case 61. The movable portion 65 is fitted inside the guide cylinder portion 63 and the outer peripheral surface of the movable portion 65 is in contact with the inner surface of the guide cylinder portion 63. The movable portion 65 can move in the direction of the axis Ax1 along the inner surface of the guide cylinder portion 63.

In the example of the intermediate unit 60, both end portions (upper and lower ends) of the guide cylinder portion 63 are open. The movable portion 65 closes the guide cylinder portion 63. The shape of the guide cylinder portion 63 is not limited to this. For example, the shape of the guide cylinder portion 63 may have a cylindrical shape having a bottom (lower surface). In this case, the movable portion 65 may be fitted to the guide cylinder portion 63 from above.

The outer peripheral surface of the movable portion 65 and the inner surface of the guide cylinder portion 63 are airtight. As illustrated in FIG. 4B, an annular sealing member 65c is arranged between the outer peripheral surface of the movable portion 65 and the inner surface of the guide cylinder portion 63 for ensuring airtightness between the two, for example. The sealing member 65c is attached to the outer peripheral surface of the movable portion 65. A groove is formed on the outer peripheral surface of the movable portion 65 and the annular sealing member 65c is fitted in the groove. Therefore, the sealing member 65c moves with the movable portion 65. Thereby, the position of the movable portion can be moved while maintaining the airtightness of the intermediate gas chamber T2.

The position of the movable portion 65 may be changeable stepwise. That is, the position of the movable portion 65 may be selectable from a plurality of positions defined at intervals in the direction along the axis Ax1 of the cylindrical main body 62.

As illustrated in FIG. 4B, an annular stopper member 63d is fitted on the inner surface of the guide cylinder portion 63. A plurality of stopper grooves 63g for the stopper member 63d to be fitted in are formed on the inner surface of the guide cylinder portion 63. The position of the movable portion 65 is determined by the stopper member 63d. The plurality of stopper grooves 63g are arranged at intervals in the direction along the axis Ax1. The position of the movable portion 65, that is, the capacity of the intermediate gas chamber T2 can be changed stepwise by changing the stopper groove 63g in which the stopper member 63d is fitted. The change in the position of the movable portion 65, that is, the change in the capacity of the intermediate gas chamber T2 can be performed manually. The movable portion 65, the guide cylinder portion 63, the stopper grooves 63g, and the stopper member 63d forms the capacity adjustment mechanism D.

In the example illustrated in the figure, four stopper grooves 63g arranged at intervals are formed on the inner surface of the guide cylinder portion 63. The number of the stopper grooves 63g may be two, three, or more than four.

In yet another example, the position of the movable portion 65 may be continuously changeable. That is, the position of the movable portion 65 may be set to an arbitrary position in a predetermined movable range. In this case, the position of the movable portion 65 may be changed manually or may be changed by an actuator as described below.

As illustrated in FIG. 4B, the guide cylinder portion 63 has a portion located inside the cylindrical main body 62 and a portion located outside the cylindrical main body 62. That is, the guide cylinder portion 63 has a portion located above a lower end 62b of the cylindrical main body 62 and a portion located below the lower end 62b of the cylindrical main body 62. For this reason, the movable portion 65 can be arranged at one or more positions defined above the lower end 62b of the cylindrical main body 62, that is, at positions defined inside the cylindrical main body 62. Further, the movable portion 65 can also be arranged at one or more positions defined below the lower end 62b of the cylindrical main body 62, that is, at positions defined outside the cylindrical main body 62. Since, as described above, the position of the movable portion 65 is allowed to a position defined outside the cylindrical main body 62, the capacity of the intermediate gas chamber T2 can be increased.

In the exampled intermediate unit 60, one position (stopper groove 63g) is defined above the lower end 62b of the cylindrical main body 62 and a plurality of positions (stopper groove 63g) are defined below the lower end 62b of the cylindrical main body 62. The number of positions defined in the guide cylinder portion 63 is not limited to the example of the intermediate unit 60. For example, a plurality of positions (stopper groove 63g) may be defined above the lower end 62b of the cylindrical main body 62.

The capacity adjustment mechanism D may be configured such that, for example, the maximum capacity of the intermediate gas chamber T2 is larger than 1.3 times the minimum capacity. The capacity adjustment mechanism D may be configured such that, for example, the maximum capacity of the intermediate gas chamber T2 is larger than 1.5 times the minimum capacity.

(Gas Pressure Adjusting Hole)

As illustrated in FIG. 4B, a gas pressure adjusting hole 65h is formed in the movable portion 65 to enable gas injection into the intermediate gas chamber T2 and gas discharge from the intermediate gas chamber T2. A valve 65f is provided at the gas pressure adjusting hole 65h. The valve 65f is, for example, a rubber valve. By inserting a gas injection needle into the gas pressure adjusting hole 65h and a hole formed in the rubber valve, gas injection and gas discharge can be performed. With this structure, both the capacity and the gas pressure of the intermediate gas chamber T2 can be appropriately adjusted. The lid member may have a cover 69 which covers the gas pressure adjusting hole 65h.

(Adjustment of Damping Characteristics)

By adjusting the capacity of the intermediate gas chamber T2 using such a capacity adjustment mechanism D, the responsiveness of the suspension system 10 can be adjusted.

Figure 6:
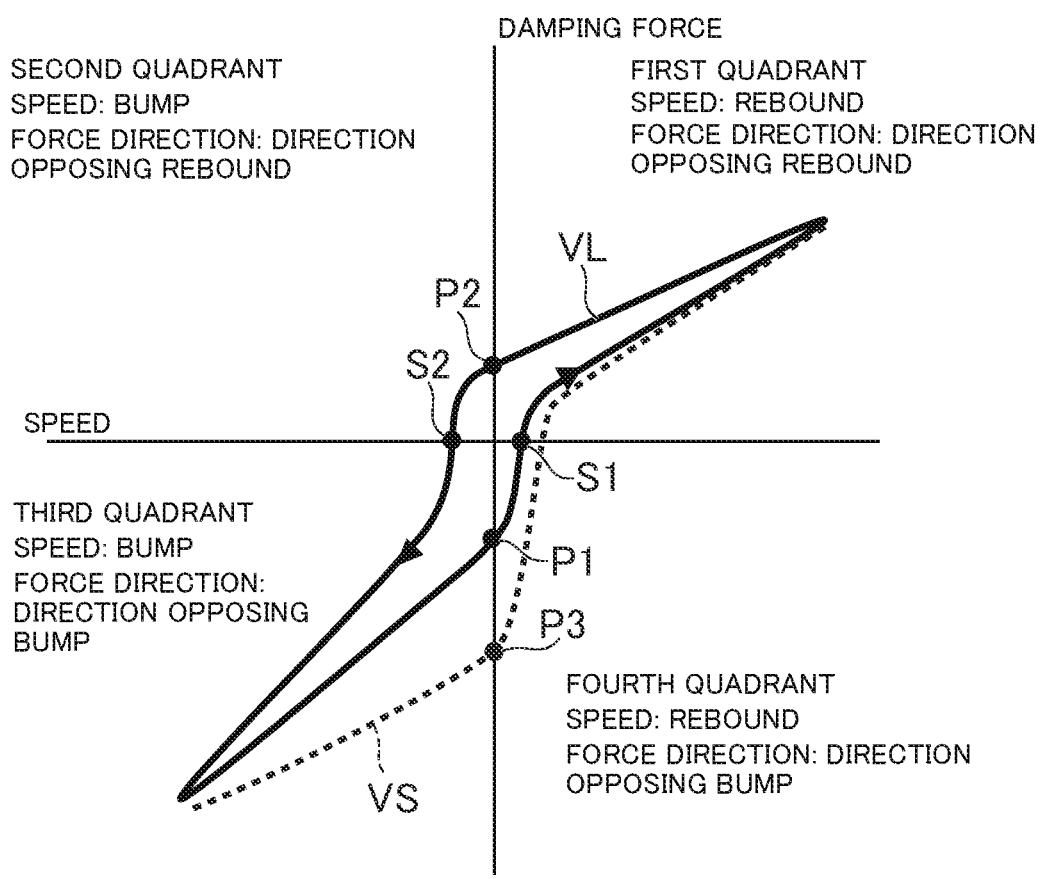
FIG. 6 is a diagram for explaining the responsiveness of the suspension system proposed in the present disclosure.
Figure 7:
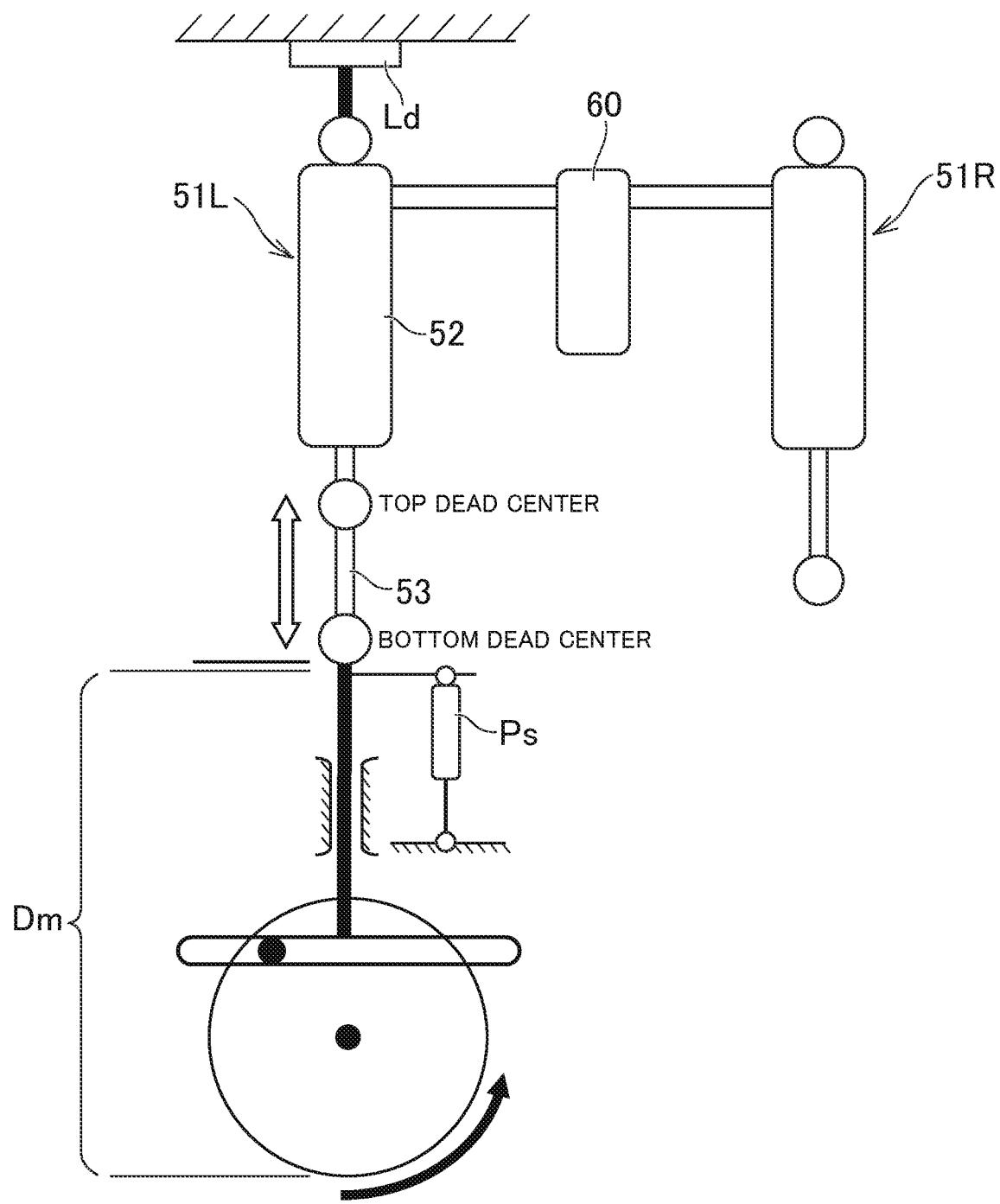
FIG. 7 is a diagram illustrating equipment illustrated in FIG. 6 for measuring a relationship between a speed and a force of the piston rod.

FIG. 6 is a graph illustrating the damping characteristics of the suspension system 10. FIG. 7 is a schematic diagram illustrating equipment for measuring the damping characteristic illustrated in FIG. 6. As illustrated in FIG. 7, the lower end of the piston rod 53 of one of the right and left dampers 51R and 51L is fixed to a drive mechanism Dm. The piston rod 53 is moved up and down by the drive mechanism Dm. For example, the piston rod 53 of the left damper 51L is connected to the drive mechanism Dm. The upper end of the cylinder 52 of the left damper 51L is attached to a load sensor Ld. The resistance (that is, the damping force) generated by the left damper 51 is measured based on the output of the load sensor Ld. Further, the piston rod 53 of the left damper 51L is connected to a position sensor Ps. The speed of the piston rod 53 is calculated based on the output of the position sensor Ps. A linear variable operation transformer can be used as the position sensor Ps, for example. The other damper (right damper 51R in FIG. 7) is arranged such that the piston rod 53 can be freely displaced.

In FIG. 6, the horizontal axis is the speed (that is, the speed of the piston 54) of the piston rod 53 calculated based on the output of the position sensor Ps, and the vertical axis is the force (that is, the damping force exerted by the damper) calculated from the output of the load sensor Ld. In these figures, each quadrant represents the following state.
(First quadrant) Speed: Speed at rebound (extension), Force: Damping force in the direction opposing rebound;
(Second quadrant) Speed: Speed at bump (compression), Force: Damping force in the direction opposing rebound;
(Third quadrant) Speed: Speed at bump, Force: Damping force in the direction opposing bump;
(Fourth quadrant) Speed: Speed at rebound, Force: Damping force in the direction opposing bump.

In FIG. 6, a solid line VL illustrates an example of the damping characteristic when the capacity of the intermediate gas chamber T2 is relatively large and a broken line VS illustrates an example of the damping characteristic when the capacity of the intermediate gas chamber T2 is relatively small. The broken line VS particularly indicates a case where the movement of the damper 51 switches from bump (compression) to rebound (extension). Further, points P1 and P3 in FIG. 6 correspond to the top dead center of the piston rod 53 and a point P2 corresponds to the bottom dead center of the piston rod 53. The gas pressure of the intermediate gas chamber T2 when the piston rod 53 is in the most extended state (maximum length) is the same between the solid line VL and the broken line VS.

As indicated by the solid line VL, when the speed of the piston rod 53 reaches S1 after the piston rod 53 has passed the top dead center, the direction of the force generated by the damper 51 is reversed. After the piston rod 53 has passed the bottom dead center, when the speed of the piston rod 53 reaches S2, the direction of the force generated by the damper 51 is reversed.

The gas pressure of the intermediate gas chamber T2 which is made by the piston rod 53 at the top dead center in a situation where the capacity of the intermediate gas chamber T2 is set to a smaller size is higher than that in a situation where the capacity of the intermediate gas chamber T2 is set to a larger size. Therefore, when the capacity of the intermediate gas chamber T2 decreases, the damping force (P3) exerted when the piston rod 53 is at the top dead center increases as indicated by the broken line VS (|P3|>|P1|). Therefore, in a situation where the capacity of the intermediate gas chamber T2 is set to a smaller size, the diaphragm 64, recessed by the pressure received from the intermediate oil chamber T1 when the piston rod 53 is at the top dead center, can smoothly return to the initial shape by the higher gas pressure of the intermediate gas chamber T2. Thus, the damping characteristics (responsiveness and damping force) of the suspension system 10 can be adjusted by changing the capacity of the intermediate gas chamber T2. For example, by changing the capacity of the intermediate gas chamber T2, the damping force (P1 or P3) exerted when the piston rod 53 is at the top dead center, can be adjusted to a value suitable for the traveling environment and the traveling performance of the vehicle.

Figure 8:
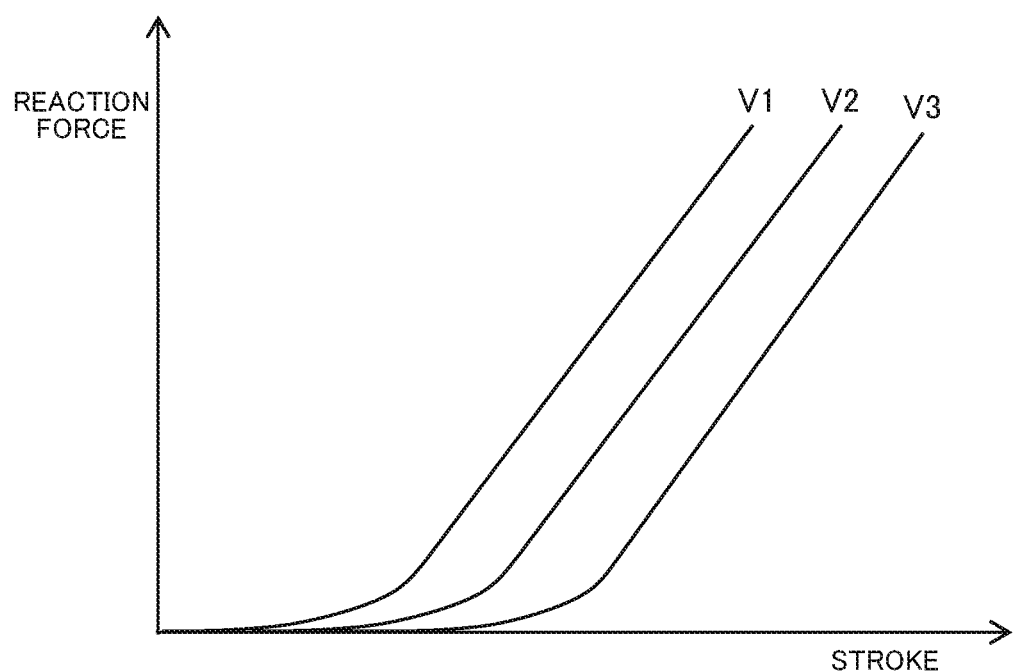
FIG. 8 is a diagram illustrating a relationship between a stroke of the piston rod and the reaction force of the damper in the suspension system proposed in the present disclosure.

When the dampers 51R and 51L are compressed, the piston rod 53 deeply enters the cylinder 52, so that the oil moves to the intermediate oil chamber T1 and thus the intermediate gas chamber T2 is compressed. FIG. 8 is a diagram schematically illustrating the relationship between the stroke (displacement in the compression direction) of the piston rod 53 and the reaction force acting on the piston rod 53 due to the compression of the intermediate gas chamber T2 in the suspension system 10. In this figure, three solid lines illustrate the relationships between the reaction force and the stroke when the capacities of the intermediate gas chamber T2 are V1, V2, and V3 (V3>V2>V1). The gas pressures of the intermediate gas chamber T2 when the piston rod 53 is in the most extended state (maximum length) are the same in the three cases. The gas pressure of the intermediate gas chamber T2 is lower when the capacity of the intermediate gas chamber T2 is larger than when the capacity of the intermediate gas chamber T2 is smaller. Therefore, as illustrated in this figure, as the capacity of the intermediate gas chamber T2 increases, the reaction force obtained in the same stroke decreases.

Since the diaphragm 64 is made of rubber, the thickness of the diaphragm 64 is reduced as the pressure acting on the diaphragm 64 increases. Therefore, even when the stroke of the piston rod 53 increases from 0 and thus the pressure of the intermediate oil chamber T1 increases, the thickness of the diaphragm 64 decreases, so that compression of the intermediate gas chamber T2 hardly occurs. Therefore, as illustrated in FIG. 8, in the range where the stroke of the piston rod 53 is small, the increase in the reaction force acting on the piston rod 53 is slow. Thereafter, when the stroke of the piston rod 53 further increases, the pressure of the intermediate oil chamber T1 increases, and accordingly, the reaction force acting on the piston rod 53 also increases. The pressure increase in the intermediate oil chamber T1 is partially absorbed by the decrease in the thickness of the diaphragm 64, so that the increase in the reaction force acting on the piston rod 53 becomes slower than in a suspension system using a free piston described below. Since the diaphragm 64 has a bag shape and the surface area of the diaphragm 64 is large, the influence of the decrease in the thickness of the diaphragm 64 is large.

(Attachment Structure of Diaphragm)

The attachment structure of the diaphragm 64 as a partition member will be described. As illustrated in FIG. 4B, the outer peripheral edge 64a of the diaphragm 64 is attached to the intermediate case 61 by being interposed between the guide cylinder portion 63 and the cylindrical main body 62. More specifically, the outer peripheral edge 64a of the diaphragm 64 is interposed between the outer peripheral surface of the guide cylinder portion 63 and the inner surface of the cylindrical main body 62. The outer peripheral edge 64a of the diaphragm 64 is pressed by the guide cylinder portion 63 and is in close contact with the inner surface of the cylindrical main body 62. With this structure, the work of attaching the diaphragm 64 can be simplified and the sealing of the intermediate gas chamber T2 and the intermediate oil chamber T1 can be ensured.

The outer peripheral edge 64a of the diaphragm 64 is hooked on the outer peripheral surface of the guide cylinder portion 63. Specifically, as illustrated in FIG. 4B, the outer peripheral edge 64a has a convex portion protruding inward as an engaging portion 64d. A groove extending in the circumferential direction is formed as an engaged portion 63a on the outer peripheral surface of the guide cylinder portion 63. The engaging portion 64d is hooked on the engaged portion 63a. Contrary to the example of the intermediate unit 60, a groove extending in the circumferential direction may be formed as an engaging portion on the inner surface of the outer peripheral edge 64a of the diaphragm 64 and a convex portion which fits into the groove may be formed as an engaged portion on the outer peripheral surface of the guide cylinder portion 63.

As illustrated in FIG. 4B, an annular stopper member 63e which defines the position of the guide cylinder portion 63 is attached to the inner surface of the cylindrical main body 62. The stopper member 63e is held by a groove formed on the inner surface of the cylindrical main body 62. The downward movement (outward movement in the direction along the axis Ax1) of the guide cylinder portion 63 is regulated by the stopper member 63e and the position of the guide cylinder portion 63 is fixed.

(Valve Assembly)

Figure 3A:
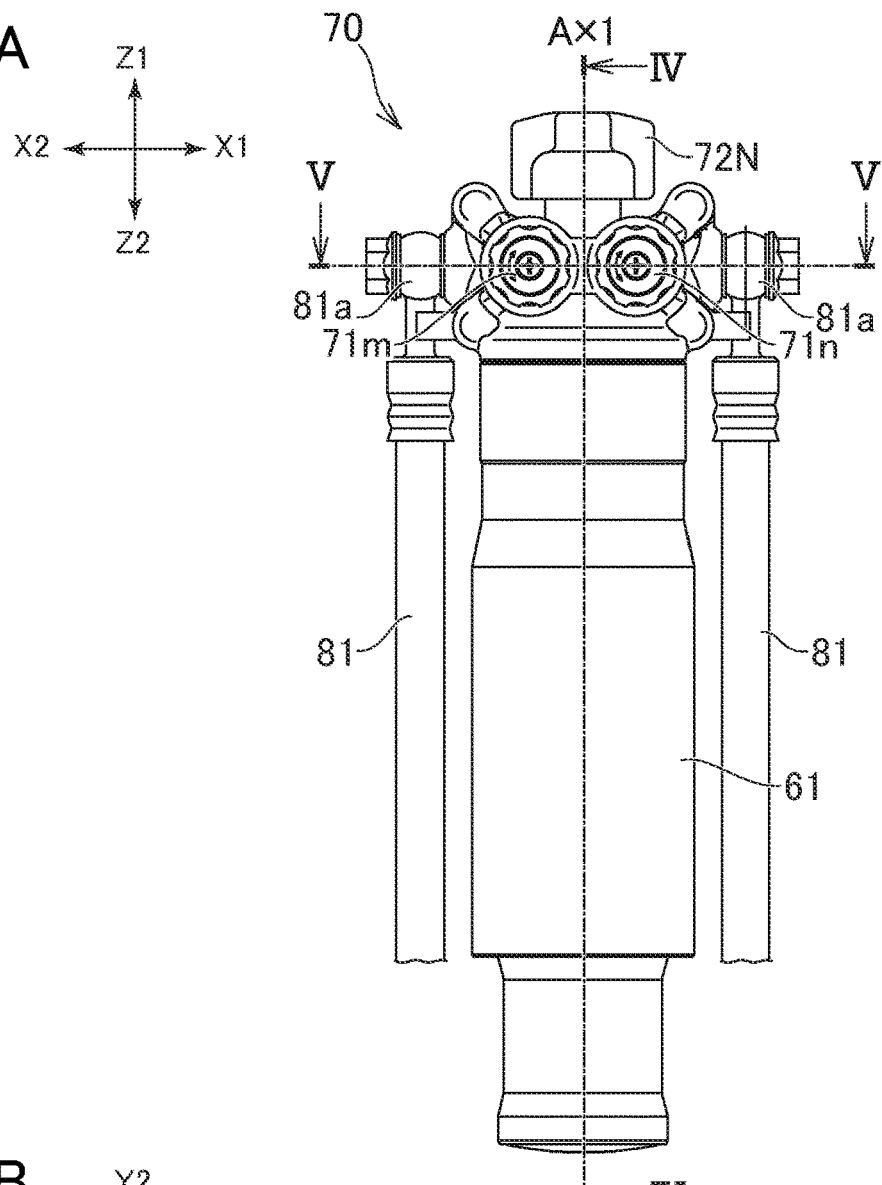
FIG. 3A is a front view illustrating an example of the intermediate unit.
Figure 5:
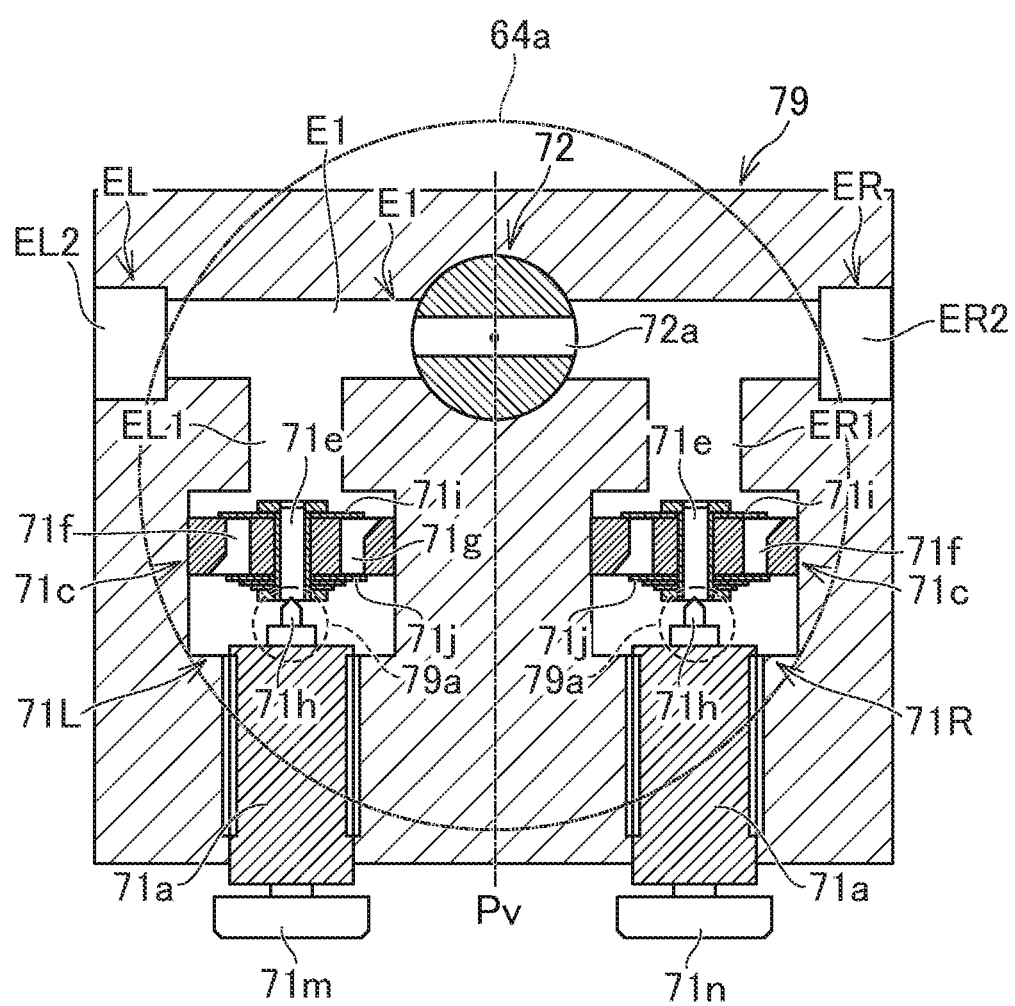
FIG. 5 is a cross-sectional view taken along the line V-V illustrated in FIG. 3A.

The intermediate unit 60 has a valve assembly 70 (see FIG. 3A). The valve assembly 70 is attached to the upper end portion (end portion opposite to the movable portion 65) of the cylindrical main body 62 and closes the cylindrical main body 62. As illustrated in FIG. 5, the valve assembly 70 includes a damping force generating mechanism 71R located on the way of an oil flow path ER1 connecting the cylinder 52 of the right damper 51R and the intermediate oil chamber T1 and a damping force generating mechanism 71L located on the way of an oil flow path EL1 connecting the cylinder 52 of the left damper 51L and the intermediate oil chamber T1. A flow path 70a connecting the right damping force generating mechanism 71R and the intermediate oil chamber T1, and a flow path 79a connecting the left damping force generating mechanism 71L and the intermediate oil chamber T1 are formed on a housing 79 of the valve assembly 70. Each flow path 79a extends in the direction (up-down direction) along the axis Ax1. The valve assembly 70 has a switching valve 72. The movable portion 65 described above is located on the opposite side of the two damping force generating mechanisms 71R and 71L and the switching valve 72 in the direction along the axis Ax1 of the cylindrical main body 62. That is, the movable portion 65 is located below the cylindrical main body 62 and the damping force generating mechanisms 71R and 71L and the switching valve 72 are located above the cylindrical main body 62.

(Damping Force Generating Mechanism)

As illustrated in FIG. 5, the damping force generating mechanism 71R is located on the way of the right oil flow path ER and generates resistance to oil movement between the right damper 51R and the intermediate oil chamber T1. The damping force generating mechanism 71L is located on the way of the left oil flow path EL and generates resistance to oil movement between the left damper 51L and the intermediate oil chamber T1. The resistance due to the damping force generating mechanisms 71R and 71L becomes a damping force with respect to the up and down movement of the vehicle body supporting members such as skis and wheels.

As illustrated in FIG. 5, the damping force generating mechanisms 71R and 71L are held by, for example, the housing 79. The flow paths ER1 and EL1 from connection ports ER2 and EL2 to the damping force generating mechanisms 71R and 71L are formed in the housing 79. Nipples 81a attached at the end portions of the pipe 81 are connected to the connection ports ER2 and EL2.

As illustrated in FIG. 5, each of the damping force generating mechanisms 71R and 71L has a first flow path 71e and a flow path member 71c in which a plurality of second flow paths 71f are formed. An oil chamber connected to the intermediate oil chamber T1 is formed in the housing 79 and the flow path member 71c is arranged in the oil chamber. Each of the damping force generating mechanisms 71R and 71L has a rotatable movable portion 71a. The movable portion 71a has a needle valve 71h which can be inserted into the first flow path 71e. The degree of opening of the first flow path 71e is determined according to the rotational position of the movable portion 71a. Valve operation portions 71m and 71n for operating the movable portions 71a are attached outside the valve assembly 70. A user can respectively adjust the degree of opening of the first flow paths 71e by operating the valve operation portions 71m and 71n. The second flow path 71f of the flow path member 71c has a valve plate 71i for limiting the amount of oil flowing through the second flow path 71f.

The structure of the damping force generating mechanisms 71R and 71L is not limited to the example described here. For example, the damping force generating mechanisms 71R and 71L may not be provided with the needle valve 71h or the valve plates 71i and the like. In this example, a small hole (orifice) for generating a damping force may be formed in the flow path member 71c.

(Bypass Flow Path and Switching Valve)

The suspension system 10 may have a bypass flow path E1 (see FIG. 1) which connects the right oil flow path ER and the left oil flow path EL. The bypass flow path E1 connects the right oil flow path ER and the left oil flow path EL without passing through the intermediate oil chamber T1 and the damping force generating mechanisms 71R and 71L. The bypass flow path E1 is formed in the housing 79 and connects the right and left flow paths ER1 and EL1 (see FIG. 5) also formed in the housing 79.

As illustrated in FIG. 1, the switching valve 72 may be provided in the bypass flow path E1. The switching valve 72 allows oil to flow through the bypass flow path E1 or restricts oil from flowing through the bypass flow path E1. When the switching valve 72 is in the open state, the oil moves between the right damper 51R and the left damper 51L without passing through the intermediate oil chamber T1 and the damping force generating mechanisms 71R and 71L.

As illustrated in FIG. 5, a switching flow path 72a for connecting the right oil flow path ER and the left oil flow path EL is formed in the switching valve 72, for example. The switching valve 72 can move to a position (connection position) connecting the right oil flow path ER and the left oil flow path EL through the switching flow path 72a and a position (blocking position) blocking the right oil flow path ER and the left oil flow path EL. The switching valve 72 is configured to be rotatable between the connection position and the blocking position.

Figure 3B:
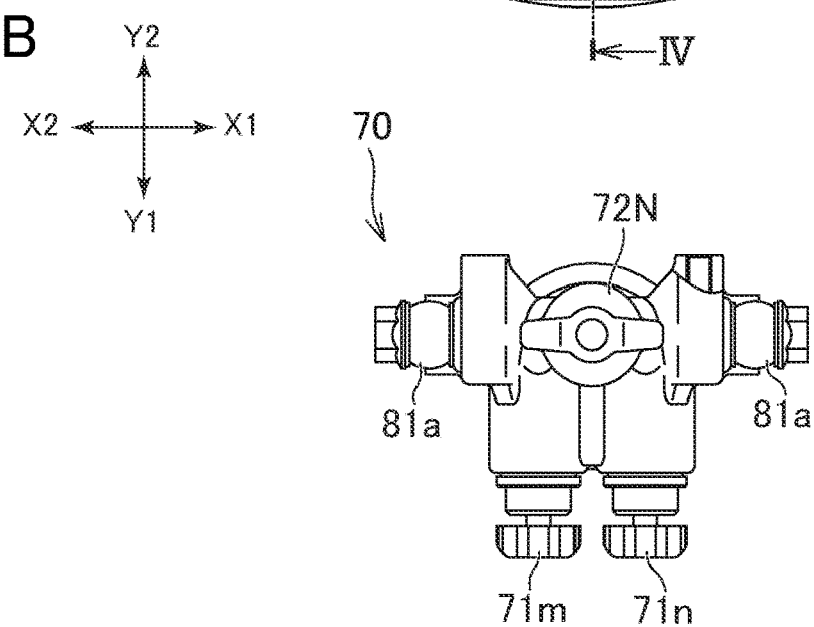
FIG. 3B is a plan view illustrating the example of the intermediate unit.

A plurality of switching flow paths having different flow path cross sections (thickness of the flow path) may be formed in the switching valve 72. That is, a plurality of switching flow paths having different resistances to the flow of oil may be formed in the switching valve 72. Further, the movement of the switching valve 72 may be sliding along a straight line instead of rotating. As illustrated in FIGS. 3A and 3B, the switching valve 72 has a valve operation portion 72N. The valve operation portion 72N is rotatable integrally with the switching valve 72.

(Function of Switching Valve)

As the vehicle turns, oil moves from the outer damper to the inner damper via the oil flow path. For example, when the vehicle turns right, oil moves from the left damper 51L to the right damper 51R. When the vehicle turns right in a state where the switching valve 72 is located at the connection position, most of the oil moves from the left damper 51L to the right damper 51R via the bypass flow path E1 without passing through the intermediate oil chamber T1 and the damping force generating mechanisms 71R and 71L. Therefore, the left damper 51L contracts smoothly and the right damper 51R extends smoothly. As a result, the contact pressure between the right vehicle body support member and the snow or road surface can be improved. When the switching valve 72 is located at the blocking position, no oil moves via the bypass flow path E1. Therefore, when the vehicle turns right, all the oil moving from the left damper 51L to the right damper 51R passes through the damping force generating mechanisms 71R and 71L, so that a greater damping force can be obtained.

When the right damper 51R and the left damper 51L contract at the same time, for example, when the right body support member and the left body support member simultaneously ride over a bump on a snow surface or a road surface, regardless of the position of the switching valve 72, all oil flowing from the right damper 51R to the intermediate oil chamber T1 passes through the damping force generating mechanism 71R and similarly all oil flowing from the left damper 51L to the intermediate oil chamber T1 passes through the damping force generating mechanism 71L. Therefore, a large damping force can be obtained. In this case, the intermediate oil chamber T1 of the intermediate unit 60 expands and the diaphragm 64 is largely recessed.

(Capacity Adjustment by Actuator)

Figure 9:
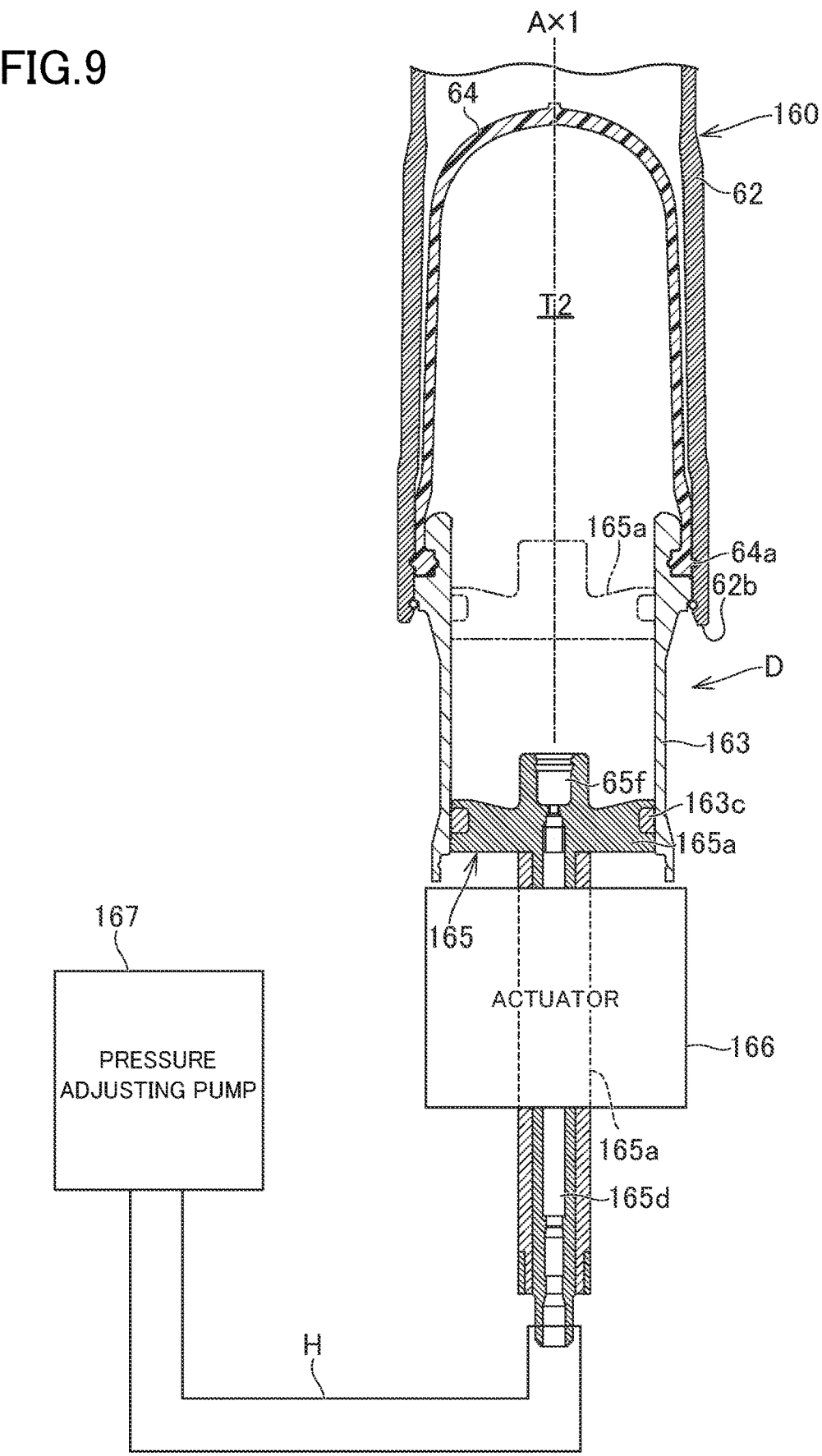
FIG. 9 is a diagram illustrating an example of the intermediate unit having an actuator which moves a movable unit.

FIG. 9 is a diagram illustrating an intermediate unit 160 which is a modification example of the intermediate unit 60. In this figure, the same reference numerals and letters are given to the same elements as the elements (parts, members, portions) illustrated in FIG. 4A and the like. Items not described for the structure illustrated in FIG. 9 may be the same as those illustrated in FIG. 4A and the like.

The intermediate unit 160 has a guide cylinder portion 163, a movable portion 165, and an actuator 166 for moving the movable portion 165. The actuator 166 includes, for example, an electric motor as a power source. The suspension system 10 has a control device which supplies driving power to the actuator 166 in response to an instruction input by a driver (or an operator). According to such a structure, the operation of adjusting the capacity of the intermediate gas chamber T2 can be simplified.

The movable portion 165 is fitted inside the guide cylinder portion 163. The movable portion 165 has a pressure receiving portion 165a which forms a part of the inner surface of the intermediate gas chamber T2 and can slide along the inner surface of the guide cylinder portion 163. The outer peripheral surface of the pressure receiving portion 165a is in close contact with the inner surface of the guide cylinder portion 163 and airtightness is secured between the two portions. For example, a sealing member 165c for ensuring airtightness is fitted on the outer peripheral surface of the pressure receiving portion 165a.

The actuator 166 is configured to, for example, convert the rotation of the electric motor of the actuator 166 into a linear motion along the axis Ax1 of the movable portion 165.

The movable portion 165 has, for example, an operated portion 165b extending from the pressure receiving portion 165a in the direction along the axis Ax1. The operated portion 165b extends toward the outside of the intermediate case 61, that is, in a direction opposite to the intermediate gas chamber T2. The actuator 166 is connected to the operated portion 165b and moves the operated portion 165b in the direction along the axis Ax1. For example, the operated portion 165b is a round bar having a screw formed on the outer peripheral surface. The actuator 166 has a rotating member (for example, a nut) which engages with a screw of the operated portion 165b. The rotating member is arranged coaxially with a rotor of the electric motor which is a power source of the actuator 166, for example. That is, a so-called hollow electric motor can be used as the actuator 166. The actuator 166 rotates the rotating member by the electric motor as a driving source and moves the operated portion 165b in the direction along the axis Ax1. That is, the operated part 165b and the actuator 166 form a feed screw mechanism. According to this structure, the position (in other words, the capacity of the intermediate gas chamber T2) of the movable portion 165 can be continuously changed. That is, the position (in other words, the capacity of the intermediate gas chamber T2) of the movable portion 165 can be changed in a stepless manner.

The mechanism formed by the actuator 166 and the movable portion 165 may not be a feed screw mechanism. For example, a rack may be formed in the operated portion 165b and the actuator 166 may have a pinion which engages the rack. In yet another example, the actuator 166 may have a solenoid valve as a power source which moves the movable portion 165 in the direction along the axis Ax1.

The suspension system 10 may have a gas pressure adjusting pump 167 for adjusting the gas pressure of the intermediate gas chamber T2, as illustrated in FIG. 9. A gas pressure adjusting hole 165d penetrating the operated portion 165b in the direction along the axis Ax1 is formed in the operated portion 165b. The gas pressure adjusting pump 167 is connected to an end portion of the operated portion 165b via, for example, a hose H. The control device forming the suspension system 10 may be configured to be able to control both the actuator 166 and the gas pressure adjusting pump 167 in response to an instruction input from an operator.

(Example in which Capacity of an Oil Chamber is Changeable)

Figure 10:
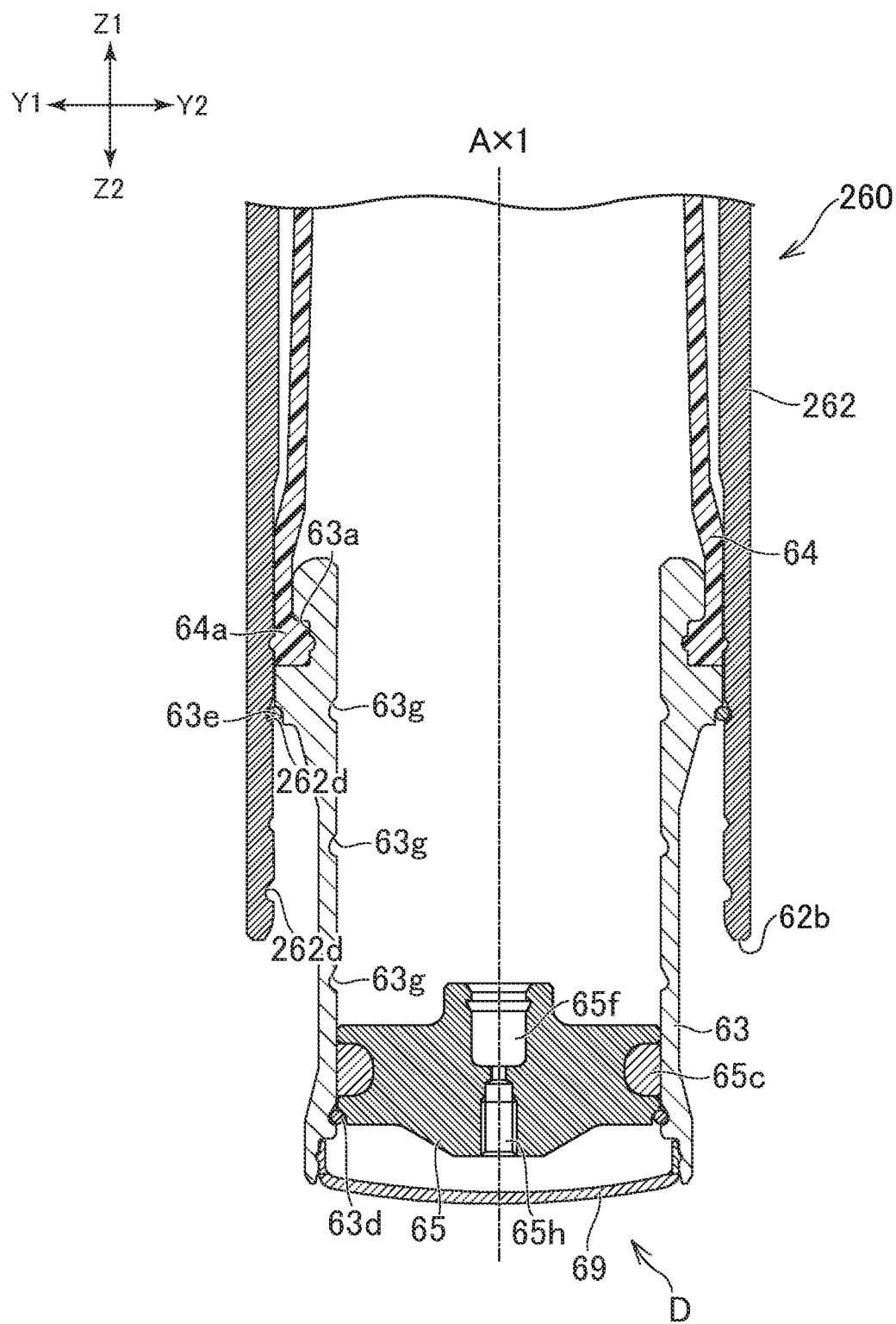
FIG. 10 is a cross-sectional view illustrating an example of the intermediate unit in which the capacity of an oil chamber as well as a gas chamber is variable.

The intermediate unit 60 may be configured such that the capacity of the intermediate oil chamber T1 can be changed in addition to the intermediate gas chamber T2. FIG. 10 illustrates an intermediate unit 260 having such a structure. In this figure, the same elements as those (parts, members, portions) illustrated in FIG. 4A and the like are denoted by the same reference numerals and letters. Items not described for the structure illustrated in FIG. 10 may be the same as those illustrated in FIG. 4A and the like.

The intermediate unit 260 illustrated in FIG. 10 has a cylindrical main body 262 and a lid member formed of the guide cylinder portion 63 and the movable portion 65. The position of the lid member with respect to the cylindrical main body 262 can be changed in the direction along the axis Ax1. More specifically, the position of the guide cylinder portion 63 with respect to the cylindrical main body 262 can be changed in a direction along the axis Ax1. The outer peripheral edge 64a of the diaphragm 64 is hooked on the engaged portion 63a of the guide cylinder portion 63, similarly to the intermediate unit 60 illustrated in FIG. 4A and the like. Therefore, the position of the outer peripheral edge 64a of the diaphragm 64 changes with the change in the position of the guide cylinder portion 63, and thus the capacity of the intermediate oil chamber T1 can be increased or decreased. According to this structure, when there are a plurality of dampers having different sizes, it is possible to secure an optimal capacity in the intermediate oil chamber T1 for the size (the size and the movable range of the piston rod 53) of the selected dampers 51R and 51L.

As described above, the position of the guide cylinder portion 63 is defined by the stopper member 63e. A plurality of grooves 262d for the stopper member 63e to be fitted in are formed on the inner surface of the cylindrical main body 262. The plurality of grooves 262d are arranged at intervals in the direction along the axis Ax1. The position (in other words, the capacity of the intermediate oil chamber T1) of the guide cylinder portion 63 in the direction along the axis Ax1 can be increased or decreased stepwise by changing the groove 262d in which the stopper member 63e is arranged.

(Example having Free Piston)

Figure 11A:
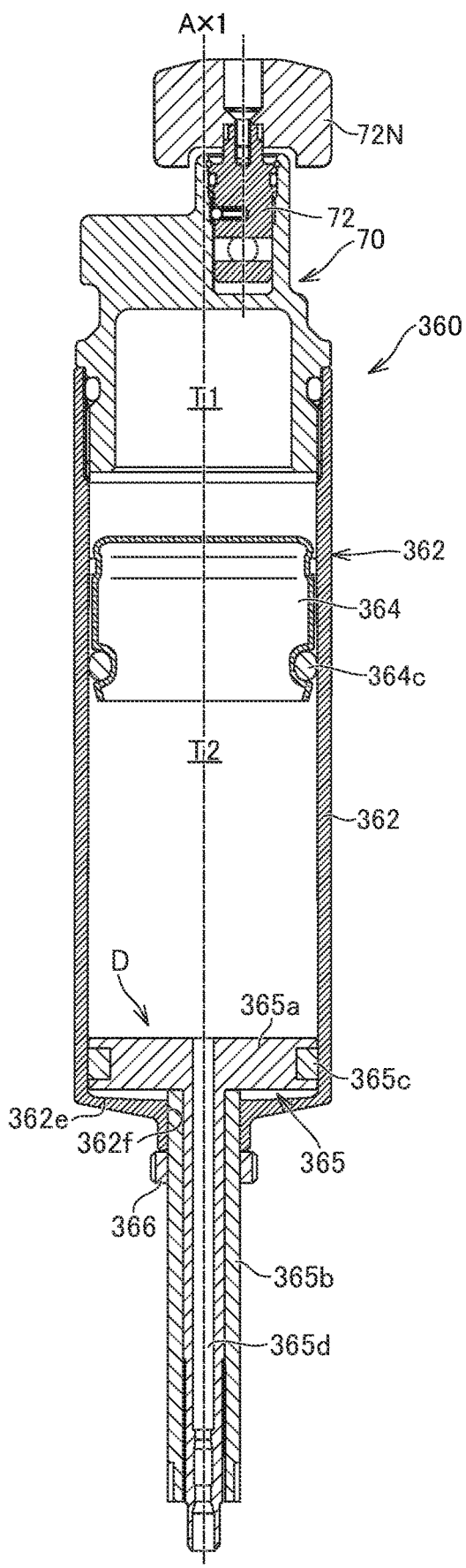
FIG. 11A is a cross-sectional view illustrating an example of the intermediate unit in which a capacity of the gas chamber is variable and which has a free piston as a partition member.
Figure 11B:
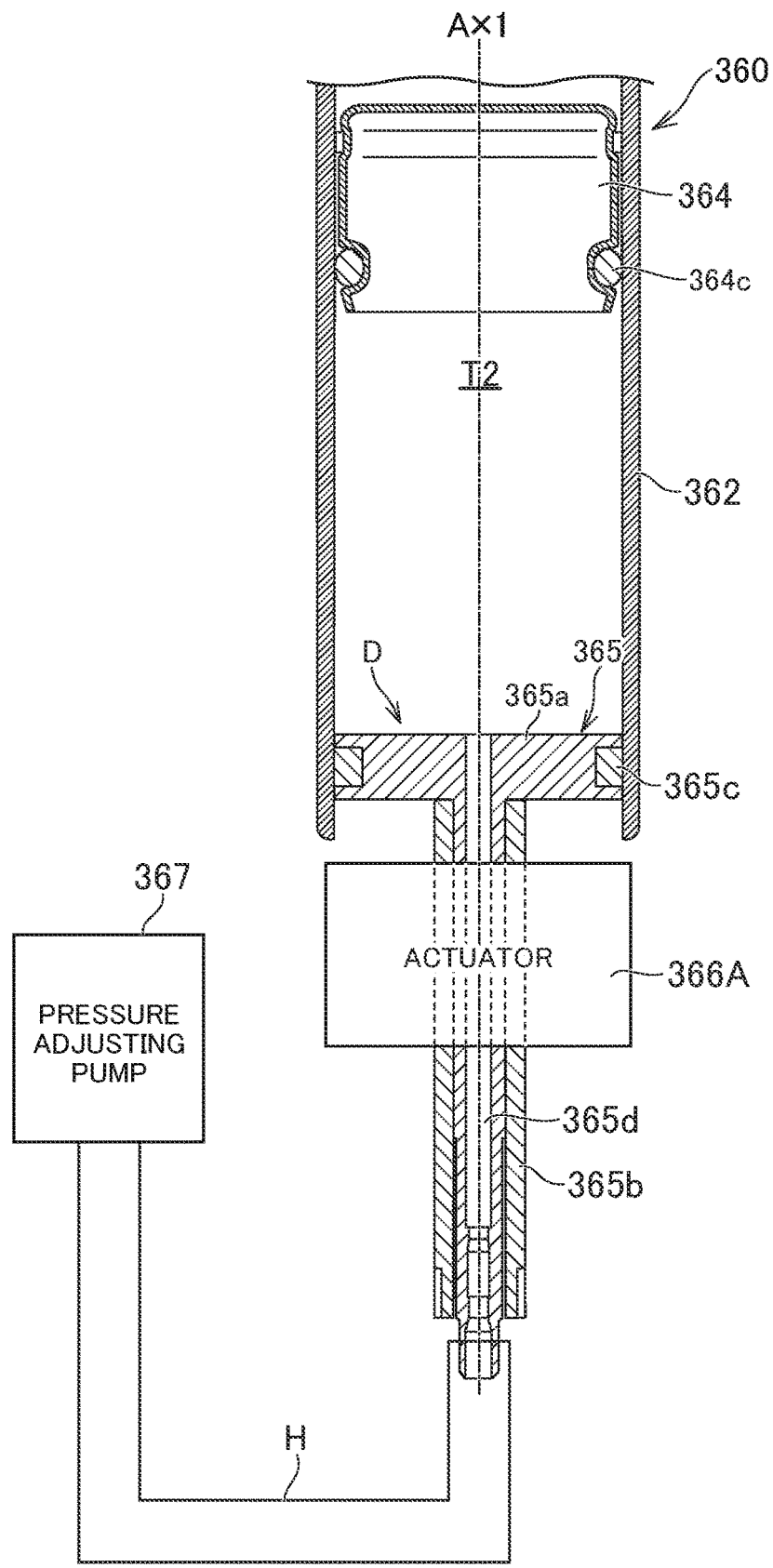
FIG. 11B is a cross-sectional view illustrating the example of the intermediate unit in which the capacity of the gas chamber is variable and which has the free piston as a partition member.
Figure 11C:
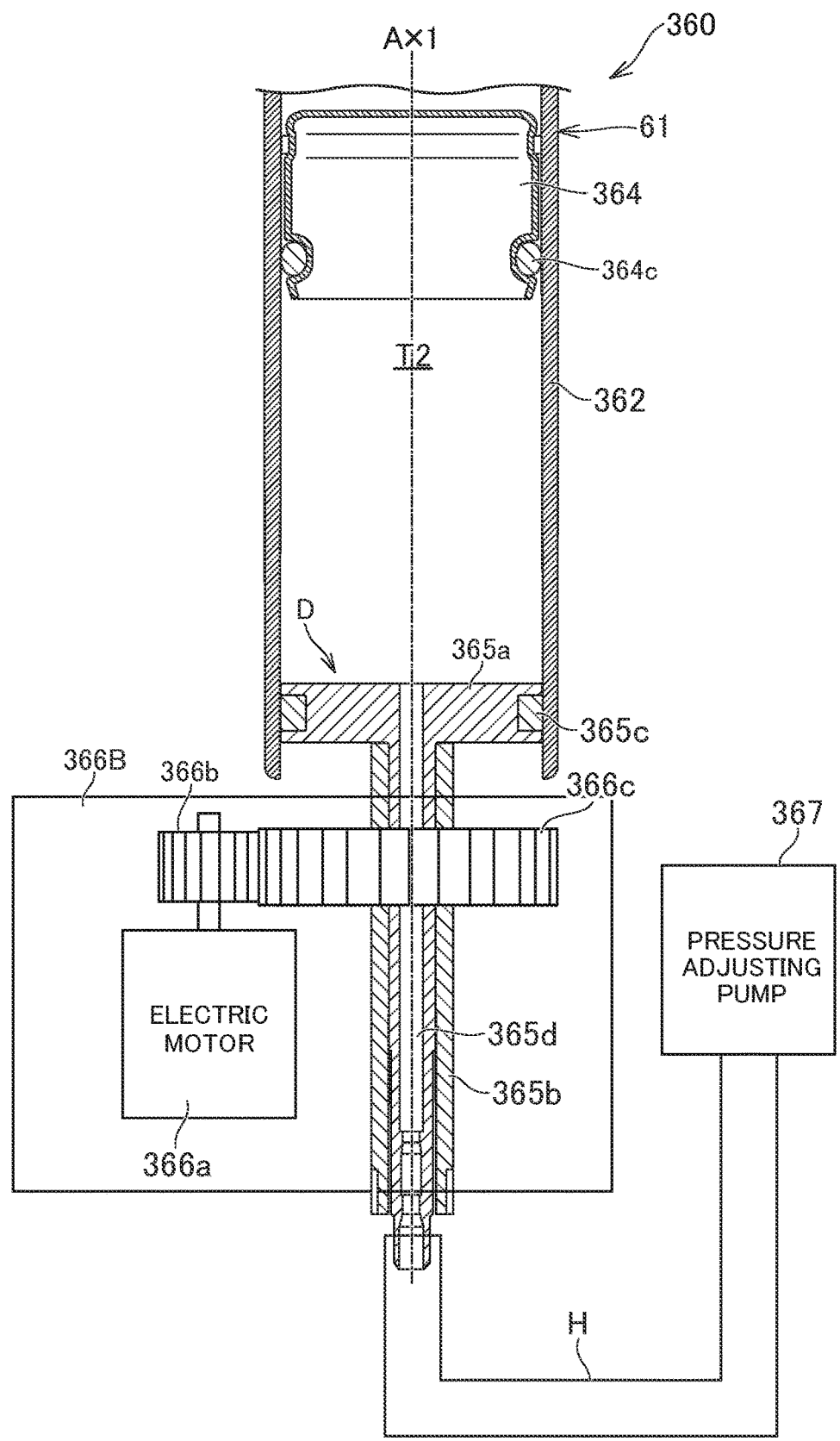
FIG. 11C is a cross-sectional view illustrating the example of the intermediate unit in which the capacity of the gas chamber is variable and which has the free piston as a partition member.

In still another example, the intermediate unit 60 may have a free piston as a partition member between the intermediate oil chamber T1 and the intermediate gas chamber T2 instead of the diaphragm 64 having softness (flexibility). FIGS. 11A to 11C illustrate examples of an intermediate unit having a free piston as a partition member. In these drawings, the same elements as those (parts, members, portions) described above are denoted by the same reference numerals and letters. The following description focuses on the differences from the intermediate units 60, 160, and 260 described above. The similar structure as the intermediate units 60, 160, and 260 may be applied to the structure in which the intermediate unit illustrated in FIGS. 11A to 11C is not described.

An intermediate unit 360 illustrated in FIG. 11A has a free piston 364 disposed in an intermediate case 361. The free piston 364 can move in the direction along the axis Ax1 of the intermediate case 361. The intermediate oil chamber T1 is formed above the free piston 364 and the intermediate gas chamber T2 is formed below the free piston 364. The arrangement of the intermediate oil chamber T1 and the intermediate gas chamber T2 may be opposite to the example of the intermediate unit 360. A sealing member 364c is provided on the outer peripheral surface of the free piston 364.

The intermediate case 361 has a cylindrical main body 362 and a movable portion 365 disposed in the cylindrical main body 362 and movable with respect to the cylindrical main body 362 in the direction along the axis Ax1. The movable portion 365 has a pressure receiving portion 365a facing the intermediate gas chamber T2 and an operated portion 365b extending from the pressure receiving portion 365a in the direction along the axis Ax1 and protruding outside the intermediate case 361. The cylindrical main body 362 has a bottom portion 362e. The operated portion 365b passes through a through hole 362f formed in the bottom portion 362e and protrudes outside the cylindrical main body 362.

An operator can move the position of the movable portion 365 by operating the operated portion 365b. That is, in the example illustrated in FIG. 11A, the capacity of the intermediate gas chamber T2 can be changed manually. A screw is formed on the outer peripheral surface of the operated portion 365b and a rotating member 366 (for example, a nut) which engages with the screw is fitted outside the operated portion 365b. An operator can move the movable portion 365 in the direction along the axis Ax1 by rotating the rotating member 366. That is, the operated portion 365b and the rotating member 366 form a feed screw mechanism. According to this structure, the position (in other words, the capacity of the intermediate gas chamber T2) of the movable portion 365 can be continuously changed. As in the exampled intermediate unit 160 illustrated in FIG. 9, a gas pressure adjusting hole 365*d* for connecting a gas pressure adjusting pump may be formed in the operated portion 365*b*.

(Example having Actuator)

As illustrated in FIG. 11B, the intermediate unit 360 may have an actuator 366A for moving the movable portion 365. The actuator 366A includes, for example, an electric motor as a power source.

The suspension system 10 has a control device which receives an instruction input from a driver (or an operator) and supplies driving power to the actuator 366. According to such a structure, the operation of adjusting the capacity of the intermediate gas chamber T2 can be simplified.

The actuator 366A is configured, for example, to convert the rotation of the electric motor of the actuator 366A into a linear movement along the axis Ax1 of the movable portion 365. Specifically, the movable portion 365 has the operated portion 365*b* in which a screw is formed on the outer peripheral surface. The actuator 366A has a rotating member (for example, a nut) which engages with the screw of the operated portion 365*b*. The rotating member is arranged, for example, coaxially with the rotor of the electric motor which is the power source of the actuator 366A. That is, a so-called hollow electric motor can be used as the actuator 366A. The actuator 366A moves the operated portion 365*b* by rotating the rotating member in the direction along the axis Ax1. That is, the operated portion 365*b* and the actuator 366A form a feed screw mechanism.

The mechanism formed by the actuator 366A and the movable portion 365 may not be the feed screw mechanism. For example, a rack may be formed in the operated portion 365*b* and the actuator 366A may have a pinion which engages with the rack. As yet another example, the actuator 366A may have a solenoid valve as a drive source instead of an electric motor.

In the example illustrated in FIG. 11B as well, the suspension system 10 may have a gas pressure adjusting pump 367 for adjusting the gas pressure of the intermediate gas chamber T2. The gas pressure adjusting hole 365*d* penetrating the operated portion 365*b* in the direction along the axis Ax1 is formed in the operated portion 365*b*. The gas pressure adjusting pump 367 is connected to an end portion of the operated portion 365*b* via the hose H, for example. The control device forming the suspension system 10 may be configured to be able to control both the actuator 366A and the gas pressure adjusting pump 367 according to an instruction input from an operator.

(Modification Example of Actuator)

The actuator 366A is not limited to the example illustrated in FIG. 11B. For example, as illustrated in FIG. 11C, an actuator 366B may include an electric motor 366*a* and a plurality of gears 366*b* and 366*c*. Further, the actuator 366B has the gear 366*c* which engages with a screw formed on the outer peripheral surface of the operated portion 365*b*, and by rotating the gear 366*c*, the operated portion 365*b* may be moved in the direction along the axis Ax1.

(Effect of Capacity Change)

Figure 12:
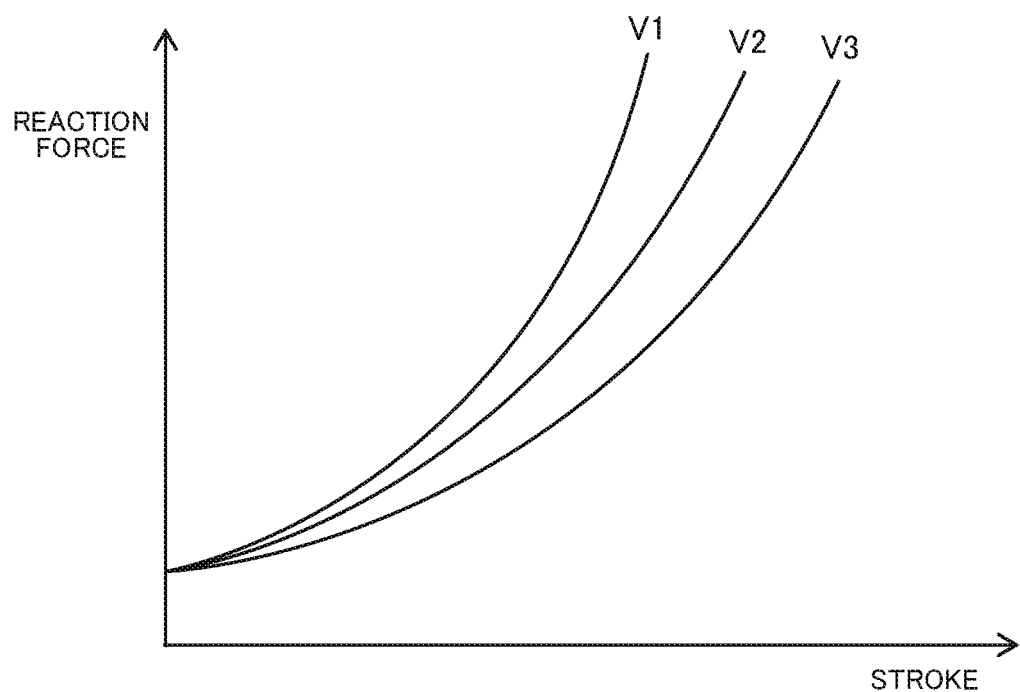
FIG. 12 is a diagram illustrating a relationship between a stroke of the piston rod and a reaction force of the damper in the suspension system having the free piston.

FIG. 12 is a diagram schematically illustrating a relationship between a stroke (displacement in the compression direction) of the piston rod 53 and a reaction force acting on the piston rod 53 due to compression of the intermediate gas chamber T2 in a suspension system using the free piston 364. In this figure, three solid lines illustrate the relationships between the reaction force and the stroke when the capacities of the intermediate gas chamber T2 are respectively V1, V2, and V3 (V3>V2>V1). Further, the gas pressure of the intermediate gas chamber T2 when the piston rod 53 is in the most extended state (maximum length) is the same in the three cases.

The gas pressure of the intermediate gas chamber T2 at the time when the capacity of the intermediate gas chamber T2 is large is lower than that at the time when the capacity of the intermediate gas chamber T2 is small. Therefore, as illustrated in FIG. 12, as the capacity of the intermediate gas chamber T2 increases, the reaction force obtained in the same stroke decreases. The free piston 364, unlike the diaphragm 64, is formed of a material having high rigidity (for example, metal). Therefore, when the free piston 364 is used, the increase in the reaction force is faster than when the diaphragm 64 is used.

(Vehicle)

Figure 13:
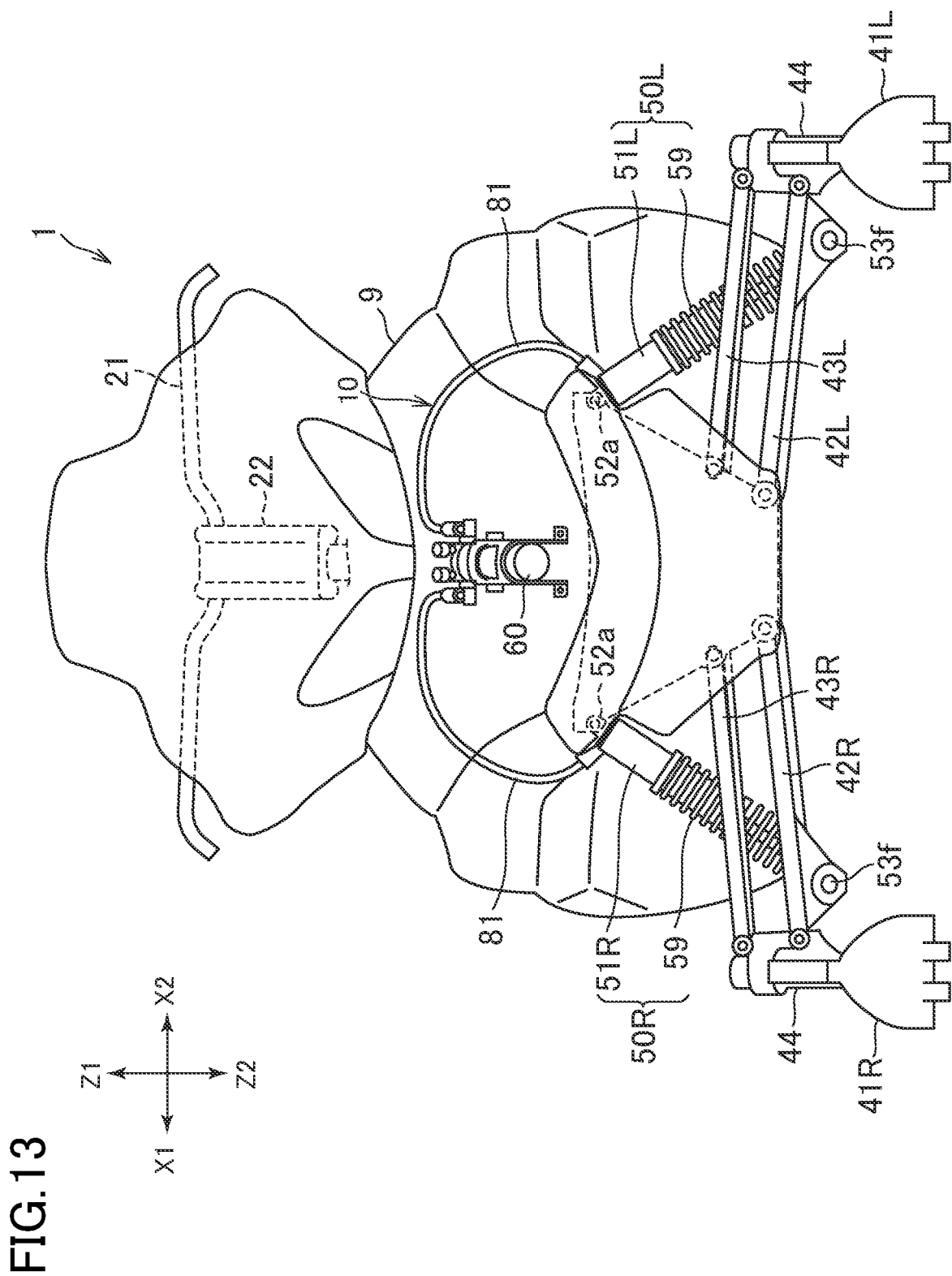
FIG. 13 is a front view of a snowmobile as an example of a vehicle equipped with the suspension system.

FIG. 13 is a diagram illustrating an example of a vehicle on which the suspension system 10 is mounted. Here, a snowmobile 1 is illustrated as an example of the vehicle. FIG. 13 is a front view of the snowmobile 1.

The snowmobile 1 has a right ski 41R (vehicle body support member portion) for supporting a vehicle body and a left ski 41L (vehicle body support member portion) for supporting the vehicle body. The right ski 41R is supported by a lower arm 42R and an upper arm 43R. Similarly, the left ski 41L is supported by a lower arm 42L and an upper arm 43L. The right arms 42R and 43R extend rightward from a base portion connected to a vehicle body frame and their end portions are connected to a knuckle 44. The right ski 41R is connected to the lower end of the knuckle 44. The left arms 42L and 43L extend leftward from a base portion connected to the vehicle body frame and their end portions are connected to the knuckle 44 to which the left ski 41L is connected. This allows the skis 41R and 41L to move up and down relatively to the vehicle body frame.

In the exampled snowmobile 1, the dampers 51R and 51L are arranged such that the cylinder 52 is located at the upper part and the piston rod 53 is located at the lower part. The upper ends 52*a* of the cylinders 52 of the dampers 51R and 51L are connected to the vehicle body frame. The lower end 53*f* of the piston rod 53 of the right damper 51R is connected to the lower arm 42R and the lower end 53*f* of the piston rod 53 of the left damper 51L is connected to the lower arm 42L. As described above, the springs 59 are provided in the dampers 51R and 51L. The intermediate unit 60 is arranged, for example, above a front cover 9 which covers an upper side of a front part of the vehicle body and the valve operation portions 72N, 71*m*, and 71*n* (see FIG. 3A) are located outside the cover 9. The layout of the intermediate unit 60 is not limited to the example of the snowmobile 1. For example, the intermediate unit 60 may be disposed inside the cover 9 and the valve operation portions 72N, 71*m*, and 71*n* may be covered by a lid which can be opened or closed.

Figure 14:
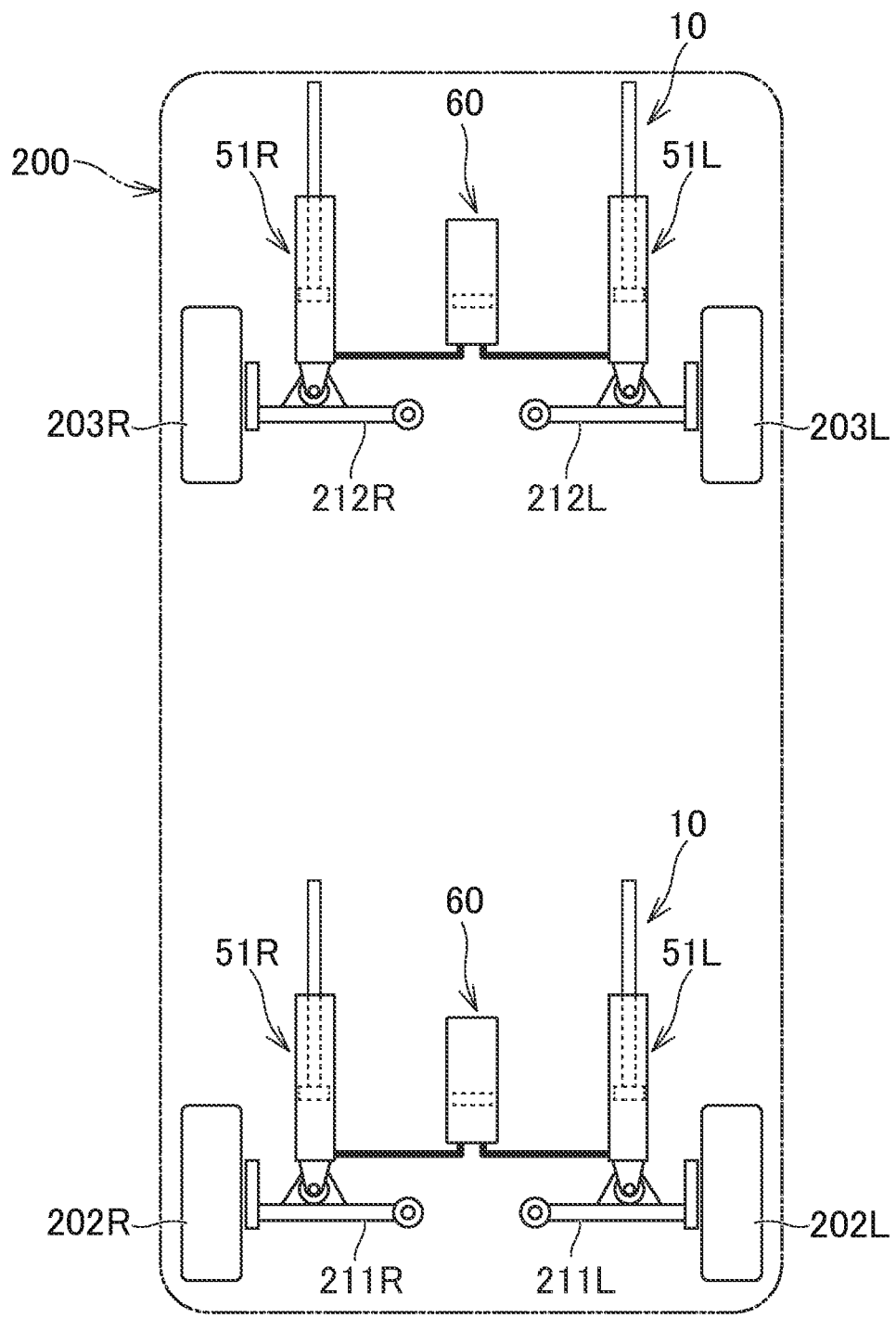
FIG. 14 is a schematic diagram of a four-wheeled vehicle as an example of a vehicle equipped with the suspension system.

The suspension system 10 may be mounted on a four-wheeled vehicle. FIG. 14 is a diagram illustrating an example of a four-wheeled vehicle 200 equipped with the suspension system 10. The four-wheeled vehicle 200 is, for example, an ATV or an ROV.

The four-wheeled vehicle 200 has four wheels 202R, 202L, 203R, and 203L as vehicle body support members. The four-wheeled vehicle 200 has arms 211R, 211L, 212R, and 212L which connect the wheels 202R, 202L, 203R, and 203L to the vehicle body frame. In the example of the four-wheeled vehicle 200, one suspension system 10 is applied to the right and left front wheels 202R and 202L and one suspension system 10 is applied to the right and left rear wheels 203R and 203L. That is, the lower end (the end portion of the cylinder 52 in the example of FIG. 14) of the right damper 51R of the front suspension system 10 is connected to the arm 211R which supports the front wheel 202R and the lower end of the left damper 51L is connected to the arm 211L which supports the front wheel 202L. Similarly, the lower end (the end portion of the cylinder 52 in the example of FIG. 14) of the right damper 51R of the rear suspension system 10 is connected to the arm 212R which supports the rear wheel 203R and the lower end of the left damper 51L is connected to the arm 212L which supports the rear wheel 203L.

The four-wheeled vehicle on which the suspension system 10 is mounted is not limited to the example of the automobile 200 illustrated in FIG. 12. For example, a suspension system 10 may be applied to the right front wheel 202R and the rear wheel 203R, and another suspension system 10 may be applied to the left front wheel 202L and the rear wheel 203L. As yet another example, a suspension system 10 may be applied to the right front wheel 202R and the left rear wheel 203L and another suspension system may be applied to the left front wheel 202L and the right rear wheel 203R.

(Summary)

(1) As described above, the suspension system 10 includes the left damper 51L having the cylinder 52 in which the oil chambers R1 and R2 are formed, the right damper 51R having the cylinder 52 in which the oil chambers R1 and R2 are formed, and the intermediate unit 60, 160, 260, or 360 which includes the case 61 or 361 having the intermediate oil chamber T1 connected to the oil chamber R1 of the left damper 51L and the oil chamber R1 of the right damper 51R and the intermediate gas chamber T2 and the partition member (64 or 364) for partitioning the intermediate oil chamber T1 and the intermediate gas chamber T2. The intermediate unit 60, 160, 260, or 360 has the capacity adjustment mechanism D including the movable portion 65, 165, or 365 which faces the intermediate gas chamber T2 and of which the position can be changed. The capacity adjustment mechanism D allows the capacity of the intermediate gas chamber T2 to be adjusted by changing the position of the movable portion 65, 165, or 365. According to the suspension system 10, the responsiveness of the damper can be improved by adjusting the capacity of the intermediate gas chamber T2.

(2) The case 61 or 361 has the cylindrical main body 62, 262, or 362 and the position of the movable portion 65, 165, or 365 can be changed in the direction along the axis of the cylindrical main body 62, 262, or 362. According to this, the structure of the intermediate unit 60, 160, 260, or 360 can be prevented from becoming complicated.

(3) The lower end of the cylindrical main body 62, 262, or 362 is open and the movable portion 65, 165, or 365 forms a member which closes the lower end of the cylindrical main body 62, 262, or 362. According to this, it is possible to suppress an increase in the number of parts of the intermediate unit.

(4) The movable portion 65, 165, or 365 is located outside the cylindrical main body 62, 262, or 362. According to this, the capacity of the intermediate gas chamber T2 can be increased.

(5) The movable portion 165 or 365 includes the pressure receiving portion 165a or 365a facing the intermediate gas chamber T2 and the operated portion 165b or 365b extending from the pressure receiving portion 165a or 365a to the opposite side of the intermediate gas chamber T2 and protruding outside the case. According to this, the operation of the movable portion 165 or 365 becomes easy.

(6) The intermediate unit 60, 160, 260, or 360 includes the damping force generating mechanism 71L located on the left oil flow path which is a flow path between the intermediate oil chamber T1 and the oil chamber R1 of the left damper 51L and the damping force generating mechanism 71R located on the right oil flow path which is a flow path between the intermediate oil chamber T1 and the oil chamber R1 of the right damper 51R. The movable portion 65, 165, or 365 may be located on the opposite side of the damping force generating mechanisms 71L and 71R in the direction along the axis of the cylindrical main body 62, 262, or 362. According to this, it is possible to prevent the layout of components in the intermediate unit 60, 160, 260, or 360 from becoming complicated.

(7) In the movable portion 65, 165, or 365, the gas pressure adjusting hole 65h, 165d, or 365d, which is a hole that enables gas injection and gas discharge with respect to the intermediate gas chamber T2, may be formed.

(8) The actuator 166, 366A, or 366B for moving the position of the movable portion 165 or 365 may be provided to the vehicle. According to this, it is easy to adjust the capacity of the intermediate gas chamber T2.

(9) The position of the movable portion 165 or 365 can be changed continuously. According to this, the capacity of the intermediate gas chamber T2 can be finely adjusted.

(10) The position of the movable portion 65 can be changed stepwise. According to this, the adjustment work by an operator on the capacity of the intermediate gas chamber T2 can be simplified.

(11) In the intermediate unit 360, the free piston 364 is used as a partition member.

(12) In the intermediate units 60, 160, or 260, the diaphragm 64 having flexibility is used as a partition member.

(Another Example)

The suspension system proposed in the present disclosure is not limited to the example of the suspension system 10 described above and various changes may be made.

For example, the intermediate unit may have a movable portion of which the size can be changed in place of the movable portion 65, 165, or 365 of which the position can be changed. For example, a bag into which a liquid is injected may be disposed as a movable portion in the intermediate gas chamber T2. According to this structure, for example, when the amount of liquid injected into the movable portion is increased, the capacity of the intermediate gas chamber T2 can be reduced.

As another example, the intermediate unit 60 may not have the bypass flow path E1 or the switching valve 72 provided on the way of the bypass flow path E1.

In still another example, the number of damping force generating mechanisms included in the intermediate unit 60 is two, but the number of damping force generating mechanisms may be one. In this case, the damping force generating mechanism may be provided between the right oil flow path ER and the left oil flow path EL.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A suspension system, comprising:
a first damper having a cylinder in which an oil chamber is formed;
a second damper having a cylinder in which an oil chamber is formed; and
an intermediate unit which includes a case having an intermediate oil chamber and an intermediate gas chamber, and a partition member for partitioning the intermediate oil chamber and the intermediate gas chamber, the intermediate oil chamber being connected to the oil chamber of the first damper and the oil chamber of the second damper, wherein
the intermediate unit has a capacity adjustment mechanism which includes a movable portion which faces the intermediate gas chamber and which allows a position or a size of the movable portion to be changed, and the capacity adjustment mechanism allows a capacity of the intermediate gas chamber to be adjusted by changing the position or size of the movable portion,
the position or size of the movable portion is fixed during a compression process of the first damper and the second damper; and
the intermediate unit includes a first damping force generating mechanism located on a first oil flow path which is a flow path between the intermediate oil chamber and the oil chamber of the first damper, and a second damping force generating mechanism located on a second oil flow path which is a flow path between the intermediate oil chamber and the oil chamber of the second damper.

2. The suspension system according to claim 1, wherein the case has a cylindrical main body, and
the position or size of the movable portion can be changed in a direction along an axis of the cylindrical main body.

3. The suspension system according to claim 2, wherein one end portion of the cylindrical main body is open, and
the movable portion forms a member for closing the one end portion of the cylindrical main body.

4. The suspension system according to claim 3, wherein the movable portion is located on an outer side of the one end portion of the cylindrical main body.

5. The suspension system according to claim 2, wherein the intermediate unit includes a first damping force generating mechanism located on a first oil flow path which is a flow path between the intermediate oil chamber and the oil chamber of the first damper, and a second damping force generating mechanism located on a second oil flow path which is a flow path between the intermediate oil chamber and the oil chamber of the second damper, and
the movable portion is located on a side opposite to the first damping force generating mechanism and the second damping force generating mechanism in the direction along the axis of the cylindrical main body.

6. The suspension system according to claim 1, wherein a gas pressure adjusting hole is formed in the movable portion, wherein the gas pressure adjusting hole is a hole that enables gas injection and gas discharge with respect to the intermediate gas chamber.

7. The suspension system according to claim 1, further comprising an actuator for moving the position of the movable portion.

8. The suspension system according to claim 1, wherein the position or size of the movable portion is changed continuously.

9. The suspension system according to claim 1, wherein the position or size of the movable portion is changed stepwise.

10. The suspension system according to claim 1, wherein the partition member is a free piston.

11. The suspension system according to claim 1, wherein the partition member is a diaphragm having flexibility.

12. The suspension system according to claim 1, wherein the position of the movable portion is selectable from a plurality of positions.

13. A suspension system comprising:
a first damper having a cylinder in which an oil chamber is formed;
a second damper having a cylinder in which an oil chamber is formed; and
an intermediate unit which includes a case having an intermediate oil chamber and an intermediate gas chamber, and a partition member for partitioning the intermediate oil chamber and the intermediate gas chamber, the intermediate oil chamber being connected to the oil chamber of the first damper and the oil chamber of the second damper, wherein
the intermediate unit has a capacity adjustment mechanism which includes a movable portion which faces the intermediate gas chamber and which allows a position or a size of the movable portion to be changed, and the capacity adjustment mechanism allows a capacity of the intermediate gas chamber to be adjusted by changing the position or size of the movable portion,
wherein the movable portion includes a pressure receiving portion facing the intermediate gas chamber and an operated portion extending from the main body to an opposite side to the intermediate gas chamber and protruding outside the case.

14. A vehicle, comprising:
a suspension system;
a vehicle body frame; and
wheels or skis connected to the vehicle body frame through the suspension system,
wherein the suspension system comprises a first damper having a cylinder in which an oil chamber is formed;
a second damper having a cylinder in which an oil chamber is formed; and
an intermediate unit which includes a case having an intermediate oil chamber and an intermediate gas chamber, and a partition member for partitioning the intermediate oil chamber and the intermediate gas chamber, the intermediate oil chamber being connected to the oil chamber of the first damper, the oil chamber of the second damper, wherein
the intermediate unit has a capacity adjustment mechanism which includes a movable portion which faces the intermediate gas chamber and which allows a position or a size of the movable portion to be changed, and the capacity adjustment mechanism allows a capacity of the intermediate gas chamber to be adjusted by changing the position or size of the movable portion,
the position or size of the movable portion is fixed during a compression process of the first damper and the second damper; and
the intermediate unit includes a first damping force generating mechanism located on a first oil flow path which is a flow path between the intermediate oil chamber and the oil chamber of the first damper, and a second damping force generating mechanism located on a second oil flow path which is a flow path between the intermediate oil chamber and the oil chamber of the second damper.

15. A suspension system, comprising:
a first damper having a cylinder in which an oil chamber is formed;
a second damper having a cylinder in which an oil chamber is formed; and
an intermediate unit which includes a case having an intermediate oil chamber and an intermediate gas chamber, and a partition member for partitioning the intermediate oil chamber and the intermediate gas chamber, the intermediate oil chamber being connected to the oil chamber of the first damper and the oil chamber of the second damper, wherein
the intermediate unit has a capacity adjustment mechanism which includes a movable portion which faces the intermediate gas chamber and which allows a position or a size of the movable portion to be changed, and the capacity adjustment mechanism allows a capacity of the intermediate gas chamber to be adjusted by changing the position or size of the movable portion,
the position or size of the movable portion is changed continuously,
the partition member is a diaphragm having flexibility.

16. A suspension system, comprising:
a first damper having a cylinder in which an oil chamber is formed;
a second damper having a cylinder in which an oil chamber is formed; and
an intermediate unit which includes a case having an intermediate oil chamber and an intermediate gas chamber, and a partition member for partitioning the intermediate oil chamber and the intermediate gas chamber, the intermediate oil chamber being connected to the oil chamber of the first damper and the oil chamber of the second damper, wherein
the intermediate unit has a capacity adjustment mechanism which includes a movable portion which faces the intermediate gas chamber and which allows a position or a size of the movable portion to be changed, and the capacity adjustment mechanism allows a capacity of the intermediate gas chamber to be adjusted by changing the position or size of the movable portion,
the intermediate unit includes a first damping force generating mechanism located on a first oil flow path which is a flow path between the intermediate oil chamber and the oil chamber of the first damper, and a second damping force generating mechanism located on a second oil flow path which is a flow path between the intermediate oil chamber and the oil chamber of the second damper, and
the movable portion is located on a side opposite to the first damping force generating mechanism and the second damping force generating mechanism in the direction along the axis of the cylindrical main body,
the partition member is a free piston.

* * * * *